United States Patent
Antipa et al.

(10) Patent No.: US 9,589,144 B2
(45) Date of Patent: Mar. 7, 2017

(54) SYSTEM AND METHOD FOR CRYPTOGRAPHIC SUITE MANAGEMENT

(71) Applicant: INFOSEC GLOBAL INC., Toronto (CA)

(72) Inventors: Adrian Antipa, Caledon East (CA); Dominic Chorafakis, Toronto (CA); Brian Neill, Burlington (CA)

(73) Assignee: INFOSEC GLOBAL INC., Toronto, Ontario ( * ) Notice: Subject to any disclaimer, the term of this patent is extended or adjusted under 35 U.S.C. 154(b) by 0 days.

(21) Appl. No.: 14/705,629

(22) Filed: May 6, 2015

(65) Prior Publication Data

US 2016/0028698 A1    Jan. 28, 2016

Related U.S. Application Data

(60) Provisional application No. 62/029,678, filed on Jul. 28, 2014, provisional application No. 62/121,757, filed on Feb. 27, 2015.

(51) Int. Cl.
   *H04L 9/00*      (2006.01)
   *H04L 9/32*      (2006.01)
   (Continued)

(52) U.S. Cl.
   CPC .......... *G06F 21/602* (2013.01); *G06F 21/606* (2013.01); *H04L 9/3066* (2013.01); *H04L 63/0428* (2013.01); *H04L 63/0442* (2013.01)

(58) Field of Classification Search
   CPC ......... H04L 63/08; H04L 63/10; H04L 63/12; H04L 63/20; H04L 63/0869; H04L 9/08
   (Continued)

(56) References Cited

U.S. PATENT DOCUMENTS 5,933,503 A * 8/1999 Schell ................... H04L 9/3247
                                                      713/187
6,490,680 B1 * 12/2002 Scheidt ............... H04L 63/0442
                                                      380/286
(Continued)

OTHER PUBLICATIONS

Written Opinion of the International Search Authority for PCT/CA2015/050397, Date of Mailing: Jul. 30, 2015.
(Continued)

*Primary Examiner* — Hosuk Song
(74) *Attorney, Agent, or Firm* — Anil Bhole; Bhole IP Law

(57) ABSTRACT

Systems and methods for cryptographic suite management are described. A system for cryptographic suite management has a cryptographic suite management unit comprising a series of APIs enabling diverse applications to call cryptographic functions. The system enables: multiple applications on an interface to access shared cryptographic resources; applications across multiple devices to share and license cryptographic resources between devices; encryption, decryption and sharing of data between devices having different cryptographic implementations; the definition, distribution and enforcement of policies governing the terms of use for cryptographic implementations, systems and methods to secure and protect shared and dynamically loaded cryptographic providers; use by an application of multiple cryptographic resources and the management of cryptographic provider bundles and associated policies across one or many cryptographic suite management unit instances.

19 Claims, 27 Drawing Sheets

(51) Int. Cl.
*G06F 21/60* (2013.01)
*H04L 9/30* (2006.01)
*H04L 29/06* (2006.01)

(58) Field of Classification Search
USPC .... 726/1; 713/168–171, 189, 150–152, 193; 380/255
See application file for complete search history.

(56) References Cited

U.S. PATENT DOCUMENTS

| | | | |
|---|---|---|---|
| 7,970,143 B2* | 6/2011 | Vennelakanti | G06F 21/62 380/277 |
| 8,327,437 B2* | 12/2012 | McAlister | H04L 63/105 726/1 |
| 8,434,128 B2 | 4/2013 | Kennedy et al. | |
| 8,683,602 B2* | 3/2014 | Waller | G06F 21/10 380/277 |
| 8,938,778 B2* | 1/2015 | Shiyafetdinov | G06F 21/602 713/193 |
| 2013/0227269 A1 | 8/2013 | Ting et al. | |

OTHER PUBLICATIONS

International Search Report for PCT/CA2015/050397, Date of Mailing: Jul. 30, 2015.

* cited by examiner

SYSTEM AND METHOD FOR CRYPTOGRAPHIC SUITE MANAGEMENT

TECHNICAL FIELD

The following relates generally to data communications and more specifically to systems and methods for securing data communications between users through cryptographic schemes.

BACKGROUND

Cryptographic implementations may be embodied as suites available to be invoked by a plurality of computer programs (also referred to as applications). Various applications invoke cryptographic operations in the storage and communication of data. The encryption operations are implemented by various encryption techniques, protocols and suites.

It is good practice in data-sensitive fields for two or more applications to communicate data with one another using a cryptographic technique. The choice of cryptographic technique depends on many factors, including processing load, error checking, authentication, non-repudiation, knowledge and trust of the other application, etc. Another factor is whether the cryptographic technique is available or common in the jurisdiction in which the application is being used. In some cases, various jurisdictions favour or enforce particular cryptographic techniques or suites for various reasons, and it is not uncommon that various countries enforce disparate cryptographic techniques within common industries. In these examples, it can be difficult to exchange data securely between entities in different countries that are in those industries.

Furthermore, cryptographic implementations are invoked by applications whose underlying source code languages and architectures vary, and which operate on numerous platform and device types. However, these applications must communicate with applications hosted on different platforms and with different code languages.

Sensitive data is increasingly transmitted over unsecured networks, while the diversity of applications continues to grow. Additionally, there is greater diversity in cryptographic implementations from a host of providers which are tailored to protect transmitted data from interception.

SUMMARY

In one aspect, a method for cryptographic suite management is provided, the method comprising: configuring a first correspondent linked to a first cryptographic suite management unit to transmit an import request to a second correspondent linked to a second cryptographic suite management unit, the request comprising the identification of a cryptographic implementation and security requirements for the cryptographic implementation for exportation by the second correspondent; configuring a second cryptographic suite management unit to provide the cryptographic implementation configured using the security requirements; configuring the second correspondent to export the configured cryptographic implementation to the first correspondent; and configuring the first cryptographic suite management unit to securely import the configured cryptographic implementation for use by the first correspondent.

In another aspect, a system for cryptographic suite management is provided, the system comprising a second correspondent linked to a second cryptographic suite management unit configured to communicate with a first correspondent linked to a first cryptographic suite management unit, wherein upon the first correspondent transmitting an import request to the second correspondent, the request comprising the identification of a cryptographic implementation and security requirements for the cryptographic implementation for exportation by the second correspondent, the second cryptographic suite management unit is configured to provide the cryptographic implementation configured using the security requirements and export the configured cryptographic implementation to the first correspondent to enable to the first cryptographic suite management unit to securely import the configured cryptographic implementation for use by the first correspondent.

In another aspect, a system for cryptographic suite management is provided, the system comprising a cryptographic suite management unit configured to perform cryptographic functions using cryptographic provider implementations from within a cryptographic library in response to a call from an application, wherein the cryptographic suite management unit is further configured to exchange one or more of said cryptographic provider implementations for use by a third party.

In embodiments, systems and methods are provided for enabling the exchange and use of cryptographic suites between applications and devices.

In further embodiments, systems and methods are provided for enabling a cryptographic suite management to make a plurality of cryptographic provider suites available to disparate applications and devices over a number of platforms.

In still further embodiments, systems and methods are provided for enabling the import/export of cryptographic suites between applications and devices.

In yet further embodiments, systems and methods are provided for trans-crypting data between devices invoking different cryptographic implementations.

In yet further embodiments, systems and methods are provided for the enforcement of policies governing the terms of use for cryptographic suites that are used or exchanged between applications and devices.

In yet further embodiments, systems and methods are provided for the protection of cryptographic suites that are exchanged between applications and devices In yet further embodiments, systems and methods are provided for defining and managing policies governing the terms of use of cryptographic suites that are used or exchanged between applications and devices.

These and other embodiments are contemplated and described herein. It will be appreciated that the foregoing summary sets out representative aspects of systems and methods for cryptographic suite management to assist skilled readers in understanding the following detailed description.

DESCRIPTION OF THE DRAWINGS

A greater understanding of the embodiments will be had with reference to the Figures, in which.

DETAILED DESCRIPTION

Figure 1:
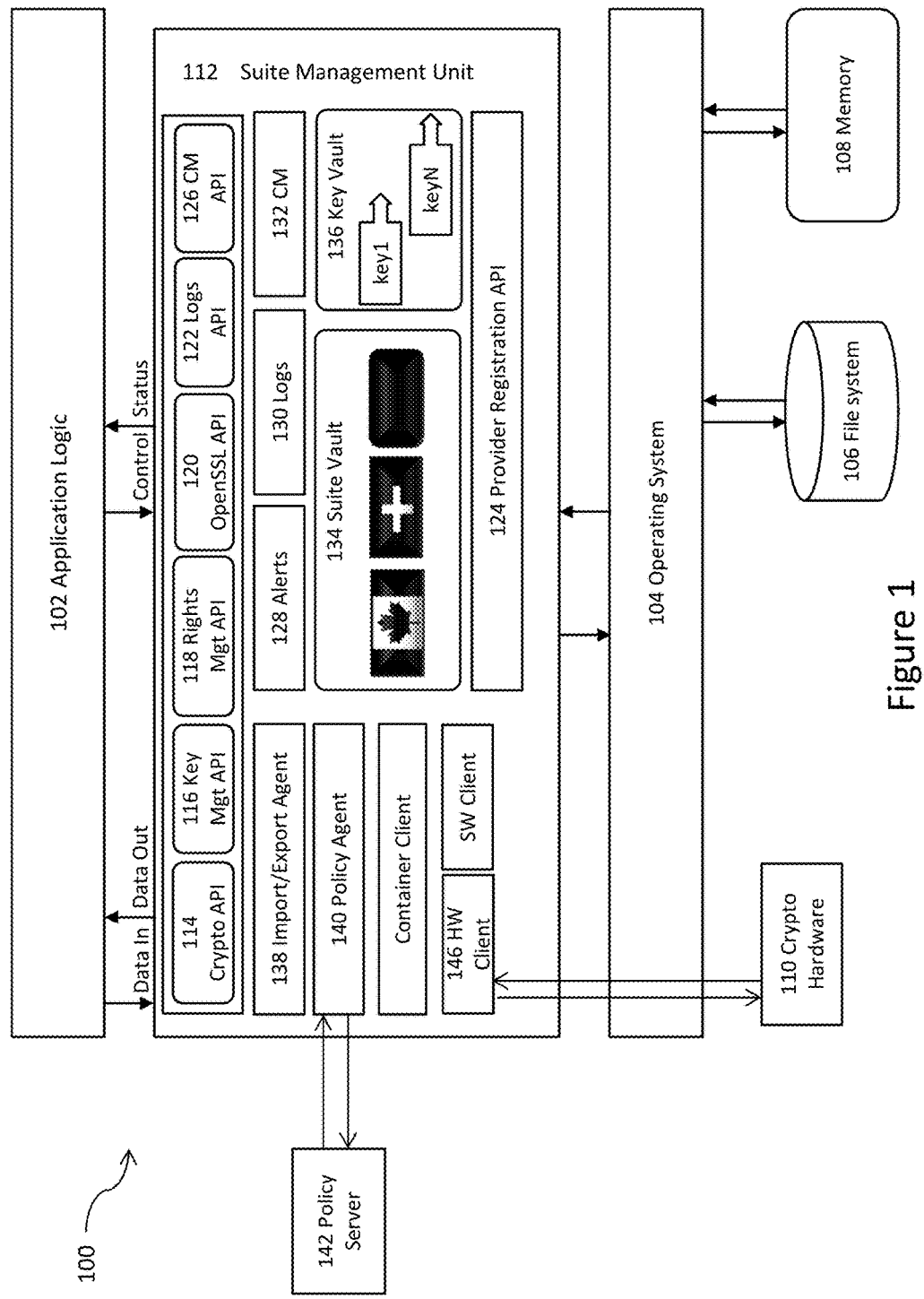
FIG. 1 illustrates a configuration of a system for cryptographic suite management.

It will be appreciated that for simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

It will be appreciated that various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

It will be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates to data communications systems secured through cryptographic schemes. In aspects, the following systems and methods enable communications between multiple cryptographic correspondents (users) or applications employing different cryptographic suites of schemes.

In one aspect, a system and method are described herein which comprise employing a protocol enabling the export from one user of an implementation of a cryptographic suite to another user for import and dynamic loading of the implementation. The method comprises a protocol to negotiate various security requirements of each of the users and their applications; and dynamically load the cryptographic suite by the importer user.

In another aspect, a system and method are described herein in which a trusted third party intermediary enables secure communications between users and applications, where a first user or application may be a data source and a second user may be a data recipient. The third party imports each user's cryptographic suite implementation, employs the implementation corresponding to the data source to decrypt ciphertexts from the data source, and then employs the implementation corresponding to the data recipient to encrypt the cipher suites. These systems and methods are functions of a cryptographic suite management system enabling: the exchange and use of cryptographic implementations between users and applications; applications to dynamically load and use cryptographic algorithms in a secure way; the enforcement of policies associated with the use of one or more cryptographic suites; secure communication between users or applications supporting disparate cryptographic algorithms; and management of cryptographic suites and their associated policies.

It is good practice in data-sensitive fields for two or more applications to communicate data with one another using a cryptographic technique. The choice of cryptographic technique depends on many factors, including processing load, error checking, authentication, non-repudiation, knowledge and trust of the other application, etc. Another factor is whether the cryptographic technique is available or common in the jurisdiction in which the application is being used. In some cases, various jurisdictions favour or enforce particular cryptographic techniques or suites for various reasons.

In one illustrative situation, a bank may wish to establish a secure communication channel between its offices in two different such jurisdictions (e.g., in two different countries), each jurisdiction enforcing a different cryptographic suite from the other. The bank's offices in one such jurisdiction may therefore use a different cryptographic suite from the bank's offices in the other jurisdiction. One approach enabled by one or more of the following embodiments would be for another party, such as, for example, the international headquarters of the bank, to act as an intermediary to communicate between the offices in the different jurisdictions using the cryptographic suite respective to each jurisdiction's offices to translate the ciphertexts from one cryptographic suite to the other.

In other situations, cryptographic implementations are invoked by applications whose underlying source code languages and architectures vary, and which operate on numerous platform and device types. However, these applications may need to communicate with applications hosted on different platforms and with different code languages.

In still other situations, sensitive data may be transmitted over unsecured networks between diverse users and applications employing numerous cryptographic implementations from a host of providers, such that each user employs a cryptographic suite tailored to protect that user's transmitted data from interception. Users employing customized cryptographic suites configured with different schemes, parameters and implementations may wish to communicate with other users while leveraging their customized cryptographic resources. Such users may desire the independence offered by customized cryptographic resources, while enjoying interconnectivity with other users. An approach enabled by one or more of the following embodiments would be for such users to exchange cryptographic suites with each other or employ a third party to employ their respective cryptographic suites to facilitate secure data exchange between users.

The following provides systems and methods for cryptographic suite management. The cryptographic suite management systems and methods provided herein enable interoperability and secured communication between applications and platforms invoking either common or disparate cryptographic provider implementations or suites. The cryptographic suite management systems and methods may further enable a plurality of applications operating on a single device or platform to access a plurality of cryptographic provider implementations. The cryptographic suite management systems and methods may further enable applications to package and export cryptographic provider implementations to other applications. The cryptographic suite management systems and methods may still further enable applications to dynamically load and execute cryptographic provider implementations in a secure manner. The cryptographic suite management systems and methods may further enable the enforcement of policies governing the terms of use of cryptographic provider implementations by applications.

In aspects, a cryptographic suite management unit enables an application to invoke cryptographic functions provided by a plurality of cryptographic provider suites.

Referring now to FIG. 1, a block diagram illustrates a system 100 running an application 102 configured to call encryption functions. The system 100 may comprise at least one such application 102 (which may be referred to herein as a "calling application"), an operating system 104, a file system 106, a memory 108, and cryptographic hardware 110, such as, for example, a hardware secure module (HSM). These elements are in communication with a cryptographic suite management unit 112 which administers the application and sharing—by import, export and licensing—of one or more cryptographic suites.

The cryptographic suite management unit 112 may comprise: a cryptographic API 114; a key management API 116; a rights management API 118; an OpenSSL API 120; a logs API 122; a provider registration API 124; a configuration management API 126; an alerts module 128; a logs module 130; a configuration manager 132; a cipher suite vault 134 for secure storage of cryptographic provider suites; a key vault 136 for secure storage of cryptographic keys, an import/export agent 138 for importing and/or exporting cryptographic provider bundles; a Policy Agent 140 for managing the distribution of policies governing the terms of use of cryptographic providers; a Policy Server 142 for centrally managing policies and cryptographic providers within a security domain; a container client 144 for accessing cryptographic provider bundles and keys in the Suite Vault and Key Vault; a hardware client 146 for communication with cryptographic hardware; and a provider registration component 124 for registering cryptographic providers with the cryptographic suite management unit. The operating system 104 communicates with the file system 106 and the memory 108. The respective role of each of these components is described herein.

Figure 27:
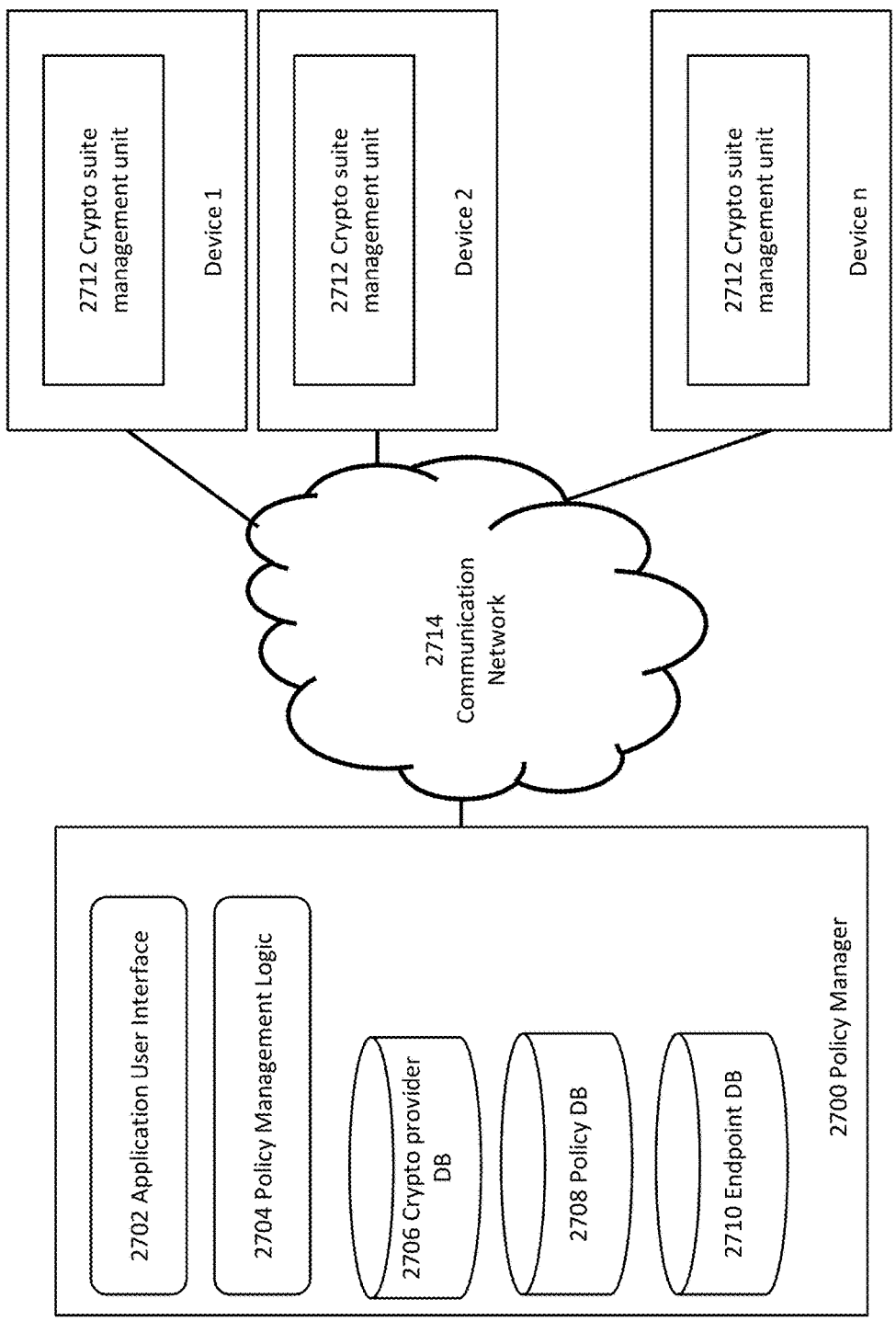
FIG. 27 illustrates a method for managing a plurality of cryptographic suite management unit instances, cryptographic provider implementations and policies.

In further aspects, the cryptographic suite management unit 112 enables importation, exchange and use of a plurality of cryptographic provider suites between devices and applications. The exchange of cryptographic provider suites between devices can be accommodated via a network connection between the devices; typically via the internet, as shown in FIG. 27.

By importing more than one cryptographic provider suite to a device, other applications on the device may access one or more of the plurality of cryptographic provider suites to encrypt and/or decrypt data or perform other cryptographic operations. The import/export operation is defined by a protocol configured to negotiate the requirements of both importers and exporters without reducing the security of the underlying applications.

Figure 2:
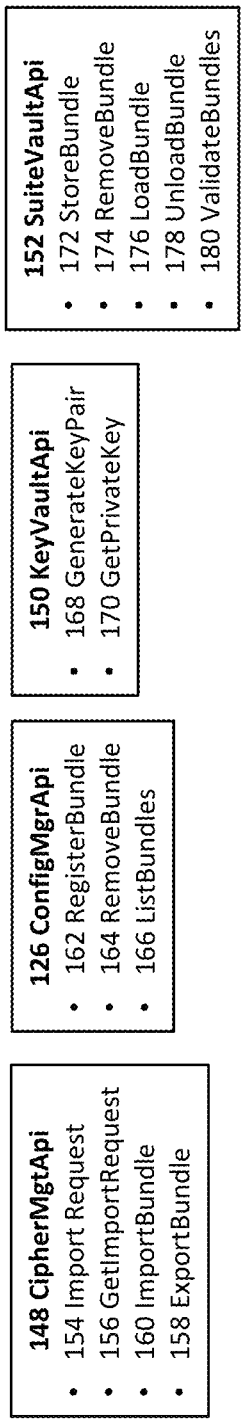
FIG. 2 illustrates APIs for an embodiment of a cryptographic suite management unit.

The cryptographic suite management unit 112 may comprise a suite of APIs, such as, for example, a cipher management API 148, a configuration manager API 126, a key vault API 150 and a suite vault API 152, associated with importing and exporting cipher suites, as illustrated in FIG. 2.

The cipher management API 148 (illustrated as "CipherMgtApi") provides functions used to manage cryptographic provider bundles, including the following examples for the cryptographic suite management unit to perform cipher suite bundle export and import operations:

"ImportRequest" 154 is a request by an importer to obtain a cryptographic provider with a specified security level and specified platform information. The request comprises a public key generated by the importer to be used for encryption of the cryptographic provider; that is, the cryptographic provider itself can be shared securely with the requesting party;

"GetImportRequest" 156 is a response made by an exporter in response to, and upon analysis of, an import request. The exporter obtains the information from the import request, determines the security level of its application, and searches its vault for a matching cryptographic provider. Based on import/export policies of any matching cryptographic provider, the exporter determines whether to export the matching cryptographic provider. The name of that cryptographic provider is provided to the application. This is the only information required by an application integrated with a cryptographic suite management unit in order to handle the cryptographic provider;

"ExportBundle" 158 produces a file containing encrypted cryptographic provider executable binaries and policy rules governing the terms of use that can be exported and lent for use by another application. In one embodiment this operation encompasses the following steps:

Receiving an importer's public key generated for the purpose of the export operation Creating a cryptographic bundle file with header fields populated with appropriate values according to the details of the request;

Creating a corresponding license file with the necessary policy and security data;

Generating, if necessary, a key pair to be used for encrypting the cryptographic provider bundle;

Encrypting the cryptographic provider bundle using the importer's public key and, if necessary, the exporter's private key;

Archiving the encrypted cryptographic provider bundle, the license file and the public keys provided to the function into a single archive, such as, for example, a zip or tarball archive.

"ImportBundle" 160 performs the import operations within an application receiving an exported cryptographic provider bundle. In one embodiment this operation comprises the following steps:

Extracting the encrypted cryptographic provider bundle, license file and public keys from the archive;

Validating the file integrity;

Using the appropriate public key from the archive to look up the corresponding private key;

Decrypting the cryptographic provider bundle using the exporter's public key and, if necessary, the importer's private key;

Validating the file headers and integrity;

Storing the cryptographic provider bundle in the Suite Vault; and

Registering the cryptographic provider bundle with the configuration manager for loading to perform cryptographic operations.

It will be appreciated by a person of skill that the names associated with the foregoing (or any following) functions may be modified as desired.

The configuration manager API 126 (illustrated as "ConfigMgrApi") provides functions to manage the configuration of the cryptographic suite management unit configuration, including the following examples for registering and unregistering bundles available for performing cryptographic operations:

"RegisterBundle" 162 stores information in respect of a bundle that has been imported into the suite vault;

"RemoveBundle" 164 deletes information in respect of a bundle that has been removed from the suite vault either as a result of user action or because of license terms; and "ListBundles" 166 returns information about all of the cryptographic provider suites available in the Suite Vault.

The configuration manager API 126 may also provide functions needed to provide calling applications with information and access to services of the cryptographic suite management unit at different security levels, which means different implementations. Each crypto provider implementation comes with a cryptographic security level. This is part of the information the exporter of the implementation has to make public.

The key vault API 150 (illustrated as "KeyVaultApi") provides functions to manage secret keys needed by the cryptographic suite management unit 112, including the following function calls to generate key pairs, and to retrieve keys needed to perform encryption and decryption operations:

"GenerateKeyPair" 168 generates an asymmetric key pair and stores the private key securely in the key vault. In the context of managing cipher suites, this call is made by the receiving application to generate a KEK/KDK pair, and by the sending application to generate the BEK/BDK pair; and "GetPrivateKey" 170 retrieves a private key from the key vault. In the context of managing cipher suites, the receiving application makes this call to retrieve the private key KDK associated with the KEK needed during decryption operations during the import process.

The suite vault API 152 provides functions for managing cryptographic provider suites stored in the suite vault including support for the following operations:

"StoreBundle" 172 persistently saves a cryptographic provider bundle in encrypted format;

"RemoveBundle" 174 permanently and securely removes a cryptographic provider bundle from persistent storage;

"LoadBundle" 176 reads a cryptographic provider bundle from persistent storage, decrypts the cryptographic provider bundle, and dynamically links the cryptographic provider bundle to the running operation for use in performing cryptographic operations;

"UnloadBundle" 178 unlinks the decrypted bundle from the running application and securely removes unencrypted code and data associated with the cryptographic provider bundle from volatile and non-volatile storage; and "ValidateBundles" 180 is called from the cryptographic suite management unit as needed to check and apply the policies for the various bundles stored in the suite vault, such as, for example, a policy to securely remove any bundle with an expired license from the persistent storage medium.

Figure 3:
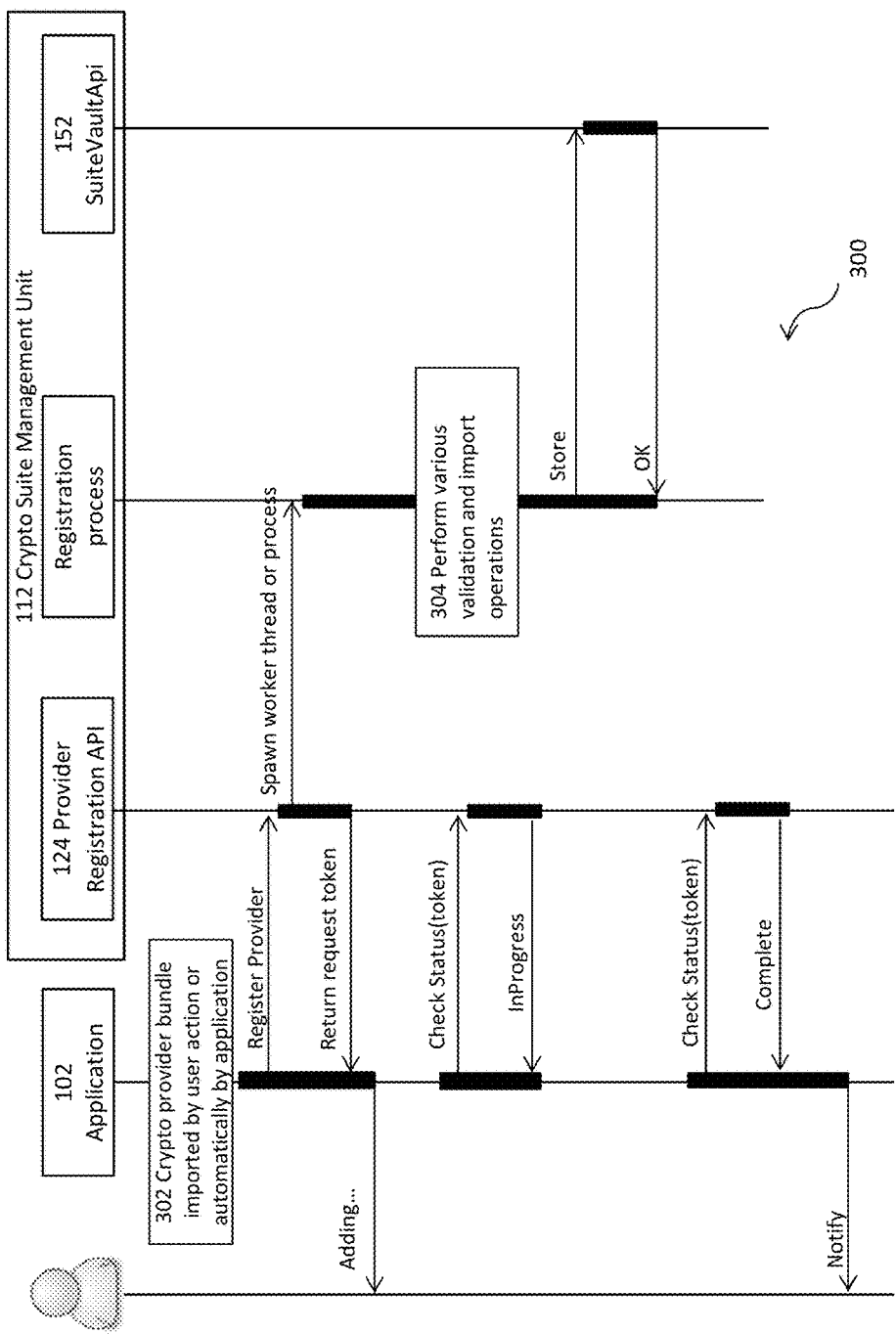
FIG. 3 illustrates a method for unblocked importation of a cryptographic provider suite.
Figure 4:
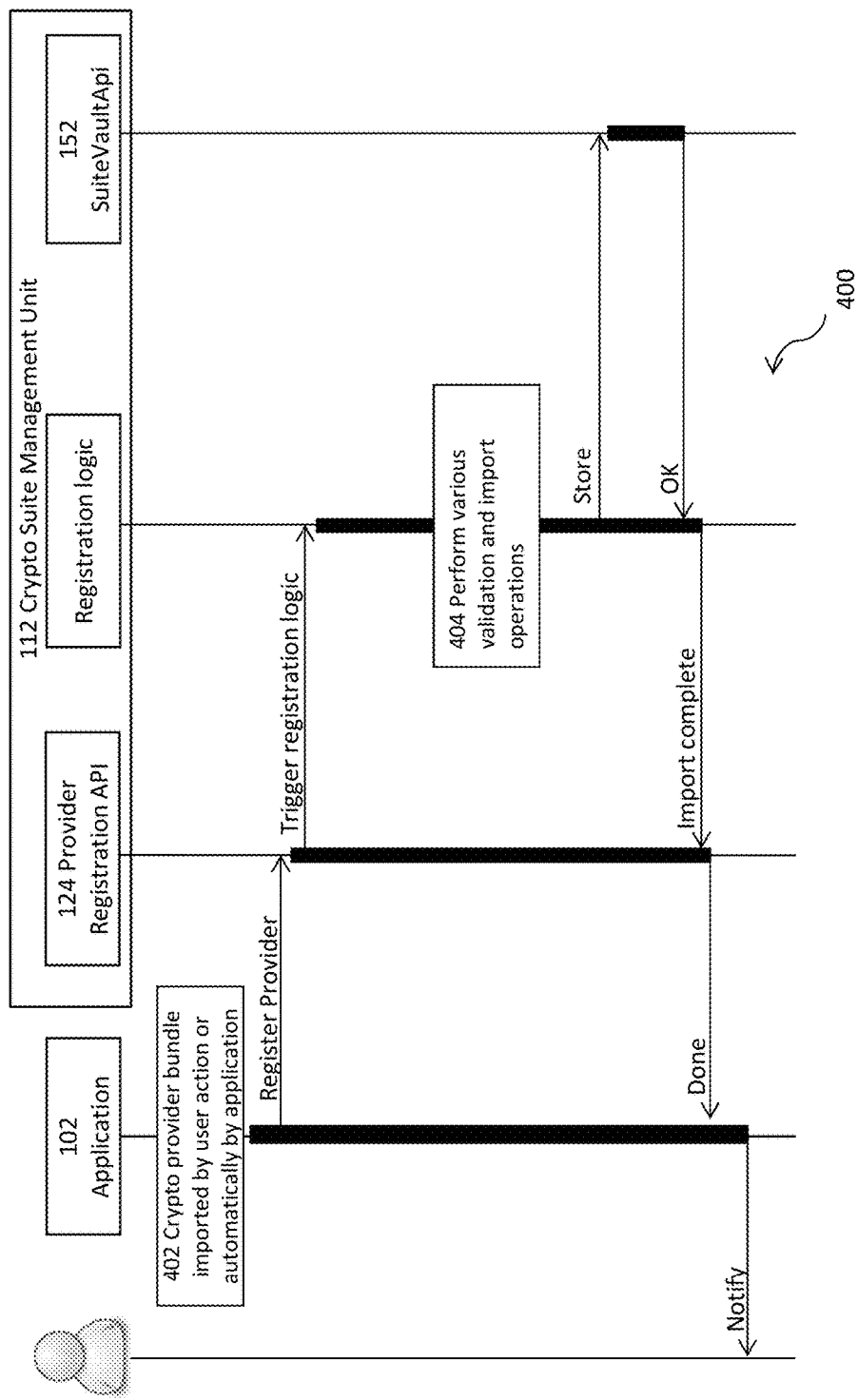
FIG. 4 illustrates a method for blocked importation of a cryptographic provider suite.

In use, a calling application 102 calls the cryptographic suite management unit 112 to import a new cryptographic provider suite, as shown in FIGS. 3 and 4. In some platforms, any blocking during the importation process may destabilise aspects of the system. For example, some mobile device platforms may be sensitive to blocking operations. Therefore, the provider registration API 124 may be configured for blocked or unblocked importation of cryptographic suites, as shown in FIGS. 3 and 4, respectively.

Referring now to FIG. 3, an asynchronous, i.e., non-blocking, importation of a cryptographic suite 300 is illustrated. At block 302, upon user request via an application user interface, or automatically as a result of application logic, a unique request token associated to a call to the provider registration API to import the cryptographic suite of a given cryptographic provider is provided by the cryptographic suite management unit to the application. At block 304, the cryptographic suite management unit then performs various validation and importation operations to import the cryptographic suite; meanwhile, the unique request token can be used by the application to request operational status updates about the importation process and take appropriate actions such as notifying application users through an application user interface, log files or other suitable techniques.

In the blocked importation method 400 illustrated in FIG. 4, the call from the application to the provider registration API, resulting from the actions performed at block 402, does not result in a return until any processes initiated by the cryptographic suite management unit at block 404 to process the importation request are successfully completed or deemed to have failed.

Importation, as described above, may occur during run-time of a calling application. While the interface between the application and the cryptographic suite management unit may be static at runtime, the interface between the cryptographic suite management unit and the supported cryptographic suites may change dynamically to reflect additions or subtractions of one or more cryptographic provider suites during run time. Therefore, the cryptographic suite management unit may be configured according to the following general approaches to engage cryptographic providers suites added at run time: (1) a run-time (dynamic) linking model in which the program instructions of the cryptographic provider suite (cryptographic code) is tightly coupled with the cryptographic suite management unit through the use of a shared or dynamic library; and (2) a distributed client-server model in which cryptographic provider suite services are accessed via remote method invocation or inter process communication.

Figure 5:
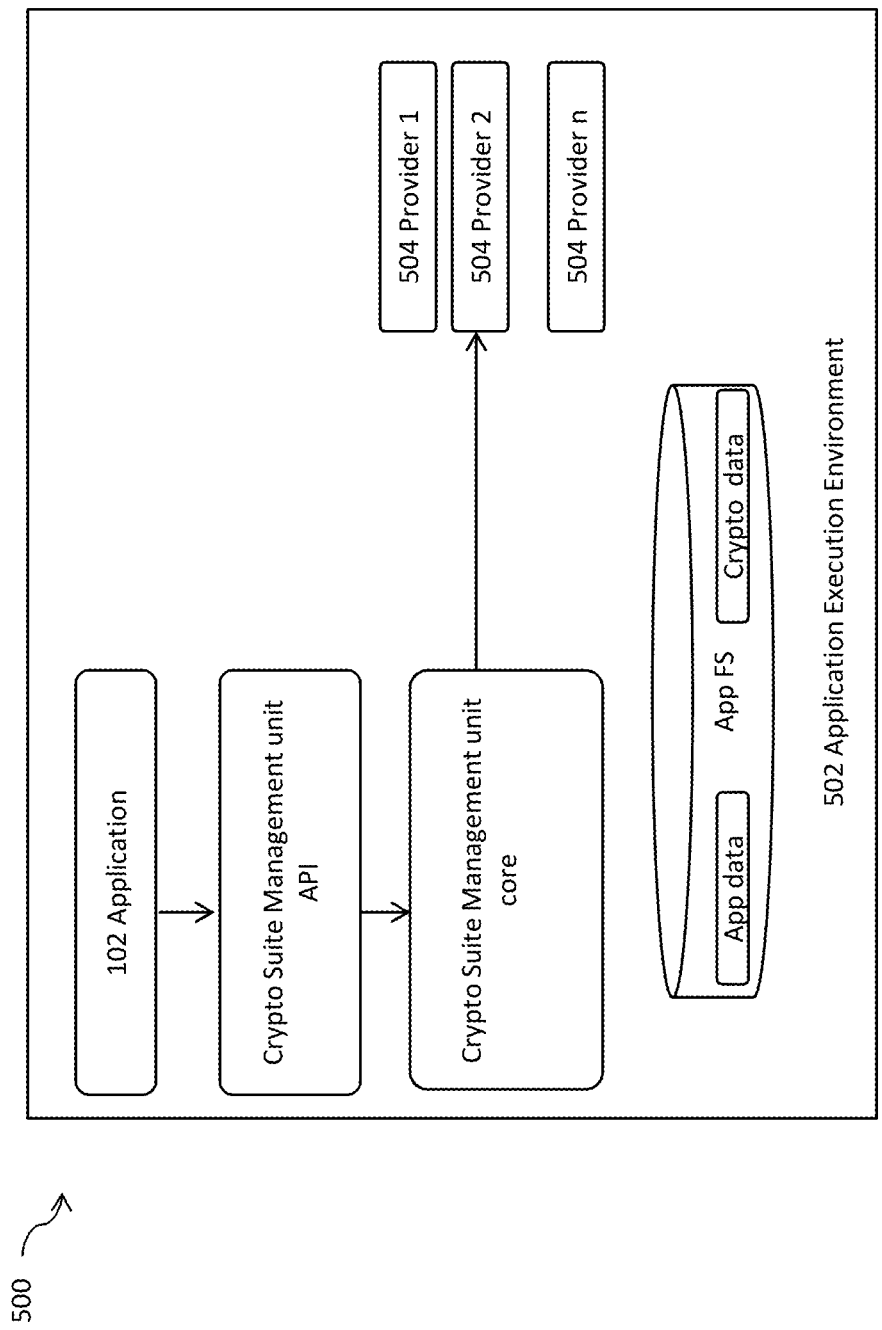
FIG. 5 illustrates a cryptographic suite management unit within a tightly coupled execution environment.

Referring now to FIG. 5, an embodiment 500 implemented using the run-time linking approach is shown. The run-time linking approach may provide relatively enhanced performance and security over the distributed model since the application 102, cryptographic suite management unit 112 and cryptographic provider 504 implementations are all executing within the same application execution environment 502. However, there may be significant variance between the mechanisms available on different supported platforms for dynamically linking components or libraries, thus requiring implementation of platform and language specific code.

Figure 6:
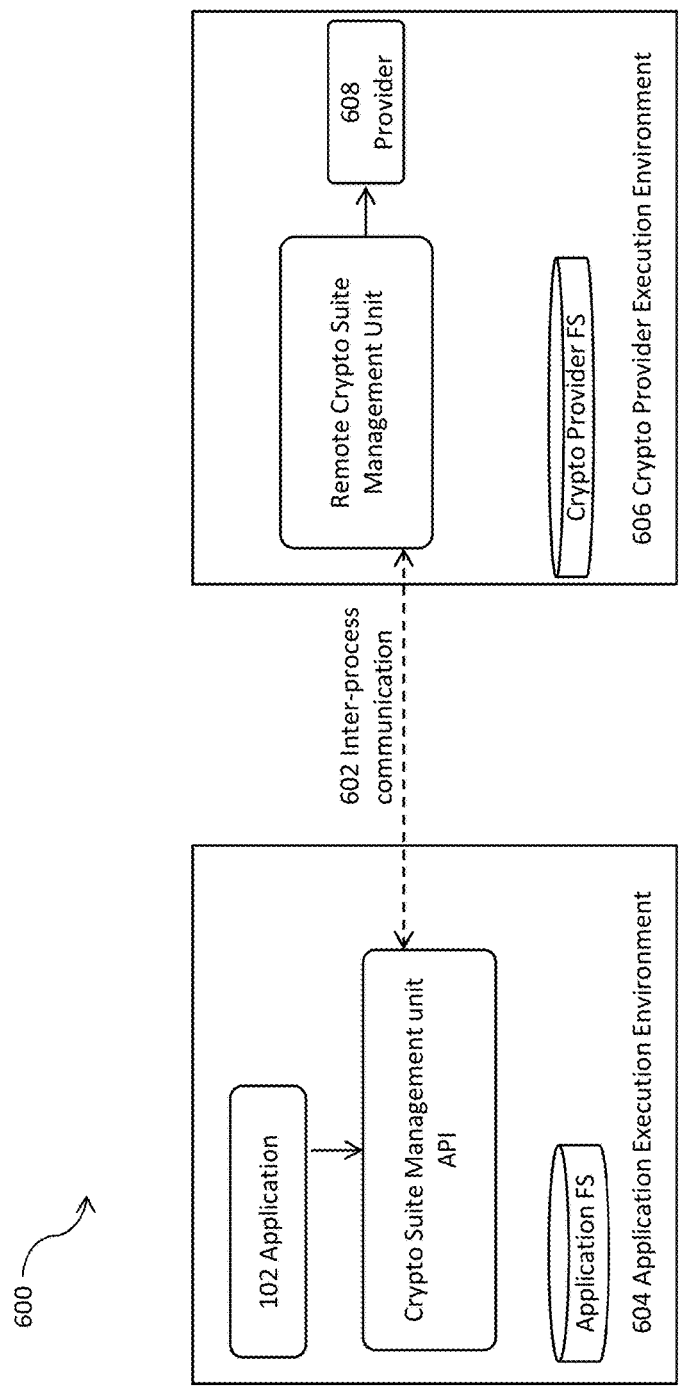
FIG. 6 illustrates a cryptographic suite management unit within a distributed execution environment.

Referring to FIG. 6, an embodiment 600 implemented with a distributed model that uses remote method invocation or inter-process communication 602 may reduce platform and language specific dependencies as far as dynamic linking is concerned, although significant differences between supported platforms may still require a degree of code customisation for each platform regarding options for threading, inter-process communication and remote method invocation. The performance and security disadvantages of the distributed model introduced by the fact that the application 102 and cryptographic providers 608 run in different execution environments 604, 606 may be at least partially mitigated through implementation of a suitable process/threading model and security mechanisms. This includes support for a multi-threaded or multi-process remote method invocation model to allow multiple cryptographic operations to be executed in parallel, the use of mutual authentication between communicating processes and the use of encryption for all inter-process communication.

Certain applications, or components thereof, using the cryptographic suite management unit may be written using different programming languages, such as, for example, Java, C or C++. In one embodiment, the cryptographic suite management unit comprises a C based API, which applications written in C or C++ could call natively, with equivalent API wrappers being provided for other programming languages.

Figure 7:
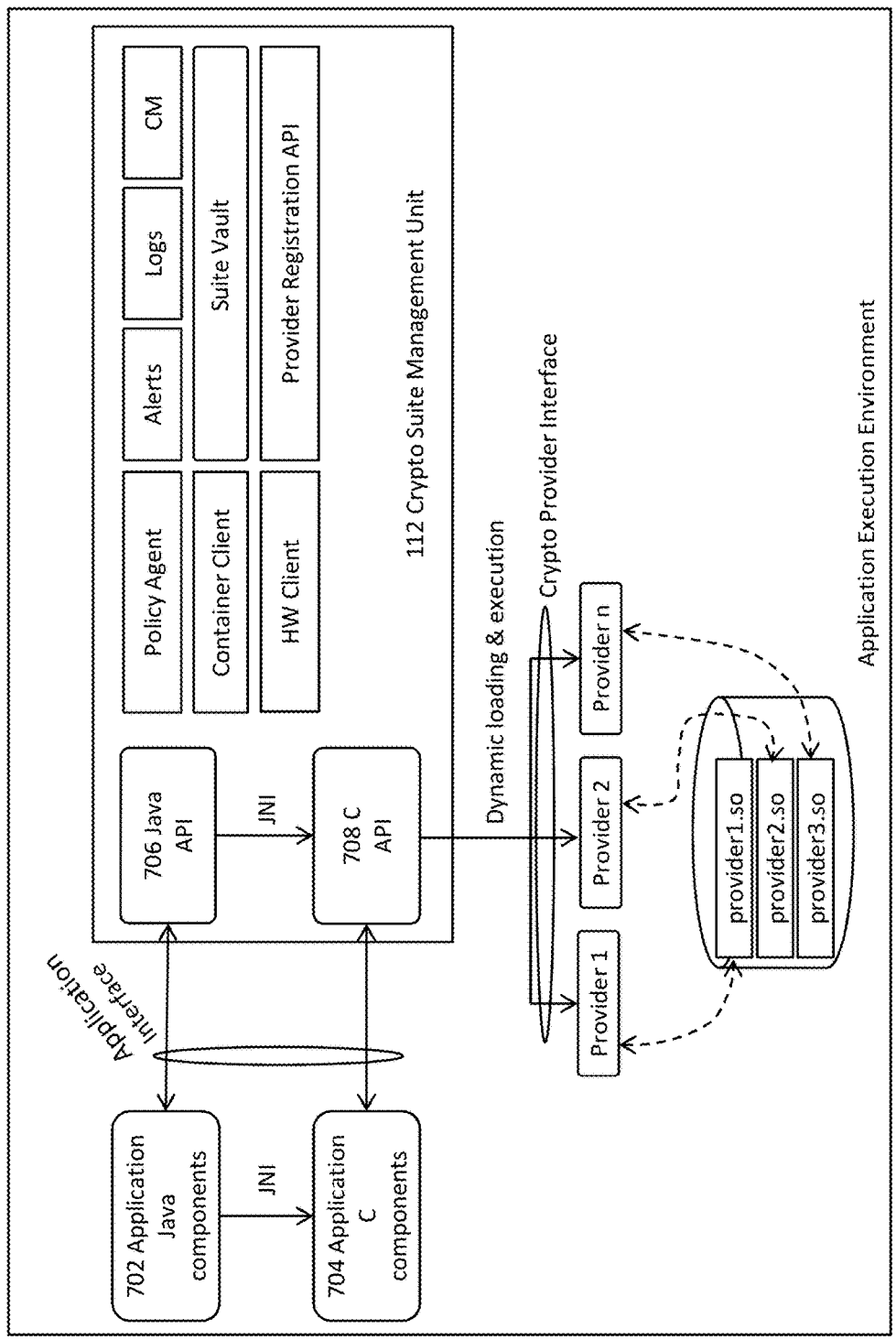
FIG. 7 illustrates a cryptographic suite management unit configured within a C and Java program environment.

The cryptographic suite management unit 112 may be configured according to a tightly coupled model, as shown in FIG. 7 and support both Java based applications 702 and C/C++ based applications/components 704. Since the cryptographic suite management unit API must, in such a configuration, be available for both C and Java based applications, the cryptographic provider suite is coded in C, so that: C components of the calling application may call cryptographic provider functions without conversion; while Java components of a calling application make calls via a Java API 706 which uses Java Native Interface (JNI) to access functionality of the C based cryptographic provider suits. Any Java application components interacting with the cryptographic suite management unit may do so via the Java API 706 classes for the cryptographic suite management unit. The Java API classes are simple wrappers that use JNI to invoke the required functionality through the corresponding C API interface 708.

Applications or components written in C 704 may interact with the cryptographic suite management unit 112 using the available C API 708 for the cryptographic suite management unit 112. The C API 708, in turn, interfaces with the rest of the tightly coupled (i.e., statically linked) cryptographic suite management unit components using native function calls.

The cryptographic suite management unit may be configured to operate on a plurality of platforms including but not limited to Android, iOS, MAC OS, Windows or a Linux based OS. These platforms are typically bundled or can be extended with implementations of common cryptographic suites and provide a set of cryptographic APIs and higher layer protocols (SSL, HTTPS) that may be used by applications running on these platforms. In addition to providing these APIs to applications, the OS itself uses these cryptographic implementations to provide features such as file system encryption.

A user of an application running on a standard platform may prefer to call the cryptographic suite management unit to invoke proprietary, customized or otherwise unavailable encryption from cryptographic providers independently of any cryptographic suites provided by default within the OS. As the security features of standard operating systems may not necessarily be reliable, the cryptographic suite management unit may be configured to protect all of its data including but not limited to cryptographic provider bundles, encryption keys, configuration and policy data, without relying on the default OS encryption features, as described herein in greater detail.

The various platforms on which the cryptographic suite management unit may be configured to provide mechanisms that allow programs running on those platforms to dynamically load and execute program components that are independent from the applications that invoke them. Examples of this capability include but are not limited to the DL API available on Linux and Mac OS, Microsoft Run-Time Dynamic Linking available on Windows and dynamic linking for iOS and Android. When components of the cryptographic suite management unit invoke cryptographic provider methods, a dynamic linking capability of the underlying platform may be used. This allows multiple cryptographic providers and provider shared libraries to be added for use by the application at runtime and removed when no longer needed, as described herein in greater detail.

Figure 8:
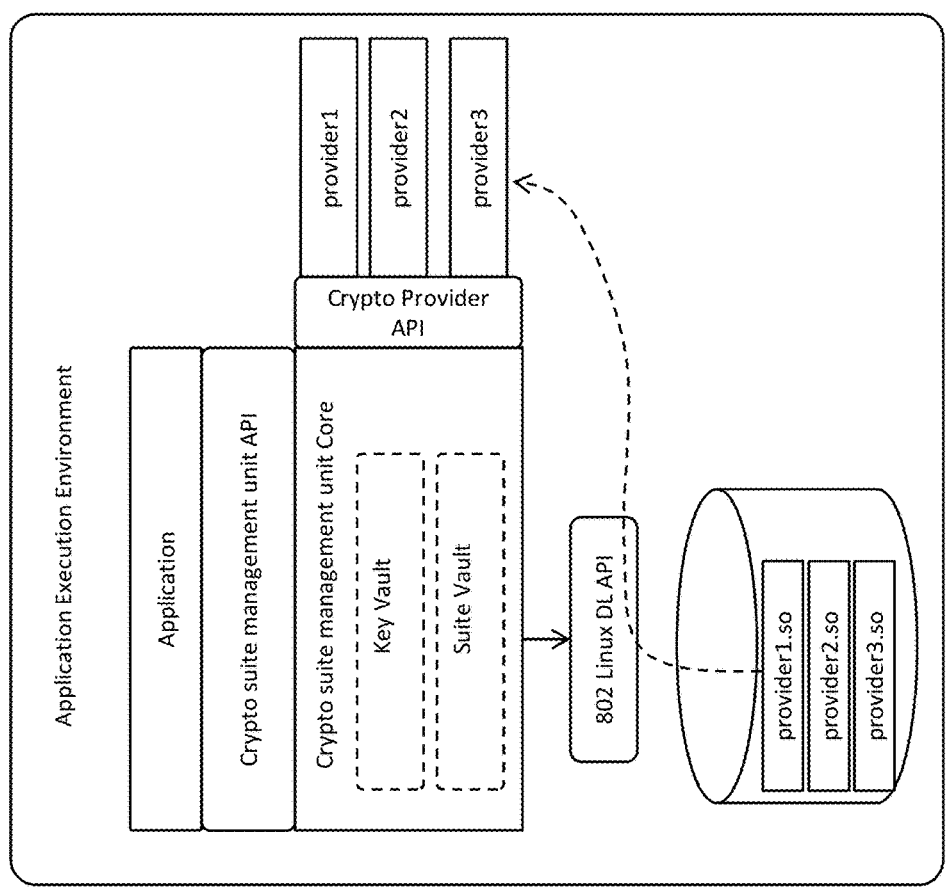
FIG. 8 illustrates dynamic loading of a cryptographic provider implementation.

In one embodiment, the architecture for Linux illustrated in FIG. 8 may leverage a generic Linux capability for dynamic loading that is applicable to Linux platforms in general. It will be appreciated that dynamically loaded (DL) libraries are the common approach for implementing plugins or modules in Linux based applications, such as, for example, the Pluggable Authentication Modules (PAM) system.

The DL API 802 provides a set of functions which allow an application to dynamically load a library at runtime and execute functions provided by the library. FIG. 8 illustrates an exemplary use of the Linux DL API by an application to load and execute code from a shared library. The following code snippet illustrates the use of the Linux DL API:

```
#include <stdlib.h>
#include <stdio.h>
#include <dlfcn.h>
int main(int argc, char **argv) {
    void *handle;
    int (*encrypt)(char *dataIn, char (dataOut);
    char *error;
    char *dataToEncrypt[ ];
    char *encryptedData[ ];
    int result;
    handle = dlopen("/lib/provider1.so", RTLD_LAZY);
    if (!handle) {
        fputs (dlerror( ), stderr);
        exit(1);
    }
    cosine = dlsym(handle, "encrypt");
    if ((error = dlerror( )) != NULL) {
        fputs(error, stderr);
        exit(1);
    }
    result = (*encrypt)(dataToEncrypt, encryptedData));
    dlclose(handle);
}
```

Figure 9:
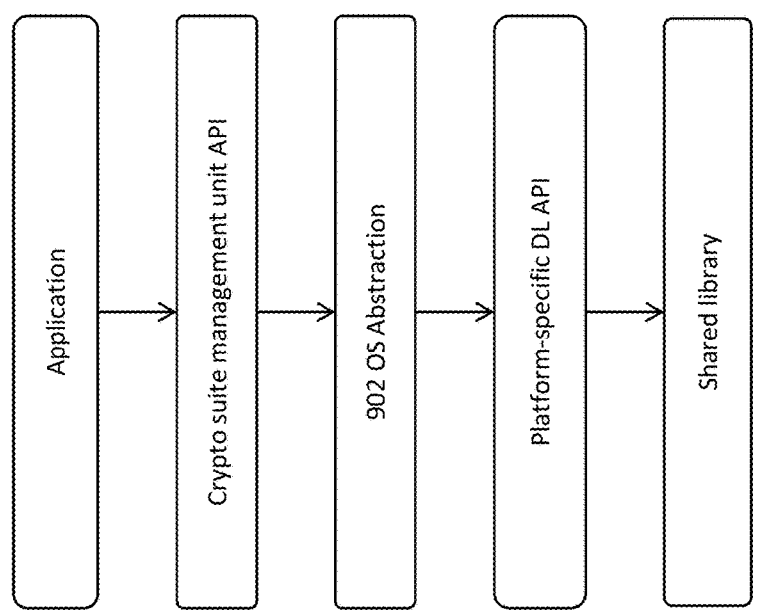
FIG. 9 illustrates the abstraction of platform-specific dynamic loading within the cryptographic suite management unit.

The DL API 802 is available across several Linux platforms, occasionally under different names, such as, for example, shl_load instead of dlopen. Further, analogous mechanisms are available on other operating systems, such as, for example, Mac OS, iOS, Android and Windows. Therefore, the cryptographic suite management unit preferably comprises an abstraction layer 902, as shown in FIG. 9 to provide platform-independent dynamic loading of libraries containing cryptographic provider functions.

The use of generic OS dynamic linking features must be leveraged in order to enable cryptographic provider implementations to be exchanged between cryptographic suite management unit instances and dynamically loaded at runtime such that the algorithms contained within the cryptographic provider implementations are available to the application. It will be appreciated that generic OS dynamic linking features do not address stringent security requirements associated with cryptographic provider implementations. The cryptographic suite management unit may provide capabilities that enable dynamic linking of cryptographic provider implementations while mitigating security threats that are relevant to cryptographic implementations.

Dynamic linking using standard OS features require that the modules being linked are available to the OS in unencrypted format such that the program instructions can be loaded into system memory and made available for execution. However, the creators or owners of custom cryptographic provider implementations may wish to keep the algorithms secret, so that storage of the libraries in unencrypted format in non-volatile memory is a security vulnerability since the algorithms could be extracted from persistent storage and reverse engineered.

In order to maintain secrecy of cryptographic provider suites, a secure storage mechanism may be provided, such as, for example, a Suite Vault 134 as illustrated in FIG. 1. The Suite Vault may be implemented as a secure hardware-based container such as an HSM or secure storage, or as a software module providing the functions needed to load and store cryptographic provider implementations as needed.

Figure 10:
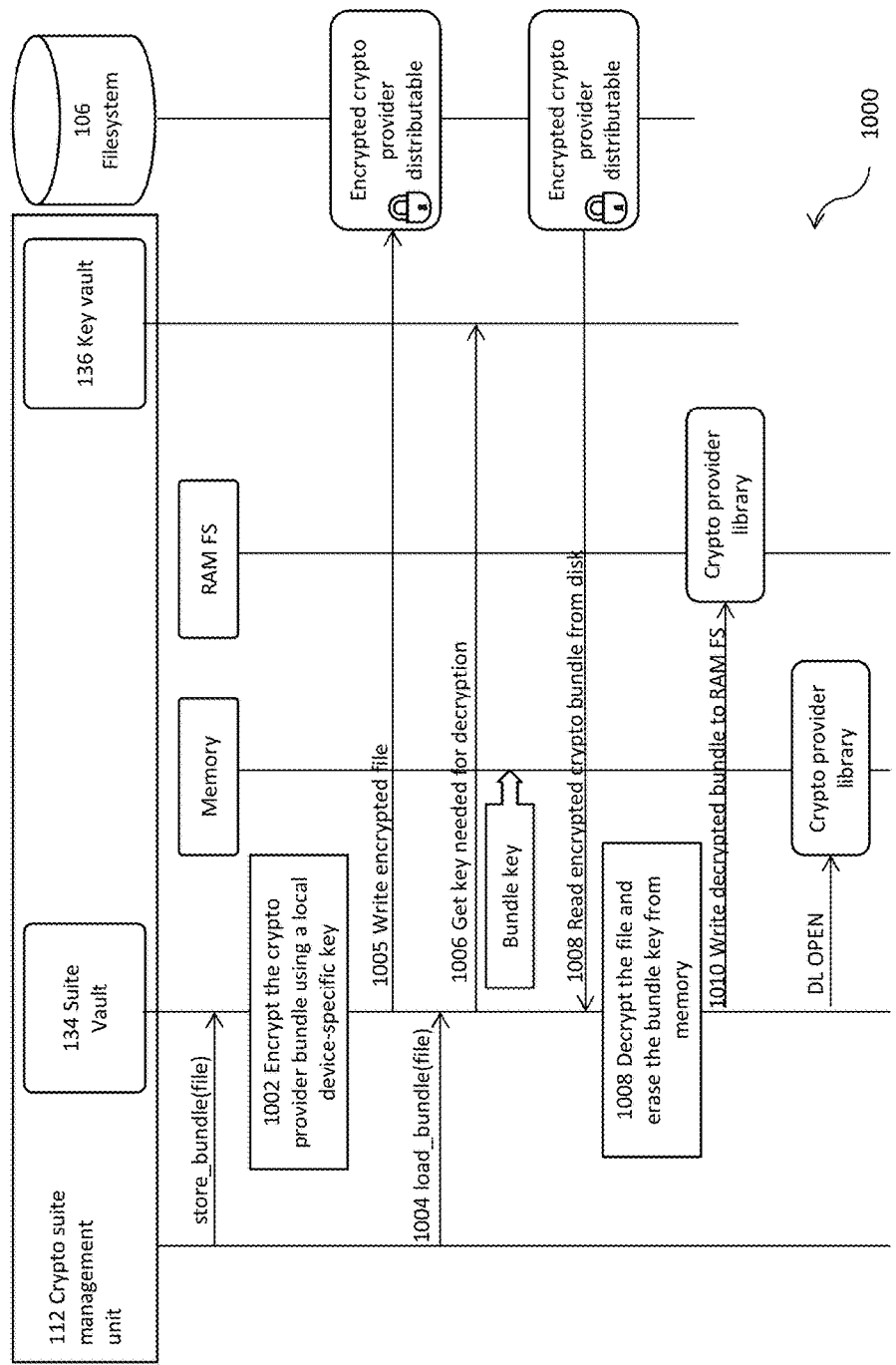
FIG. 10 illustrates a method for suite vault loading and storing.
Figure 11:
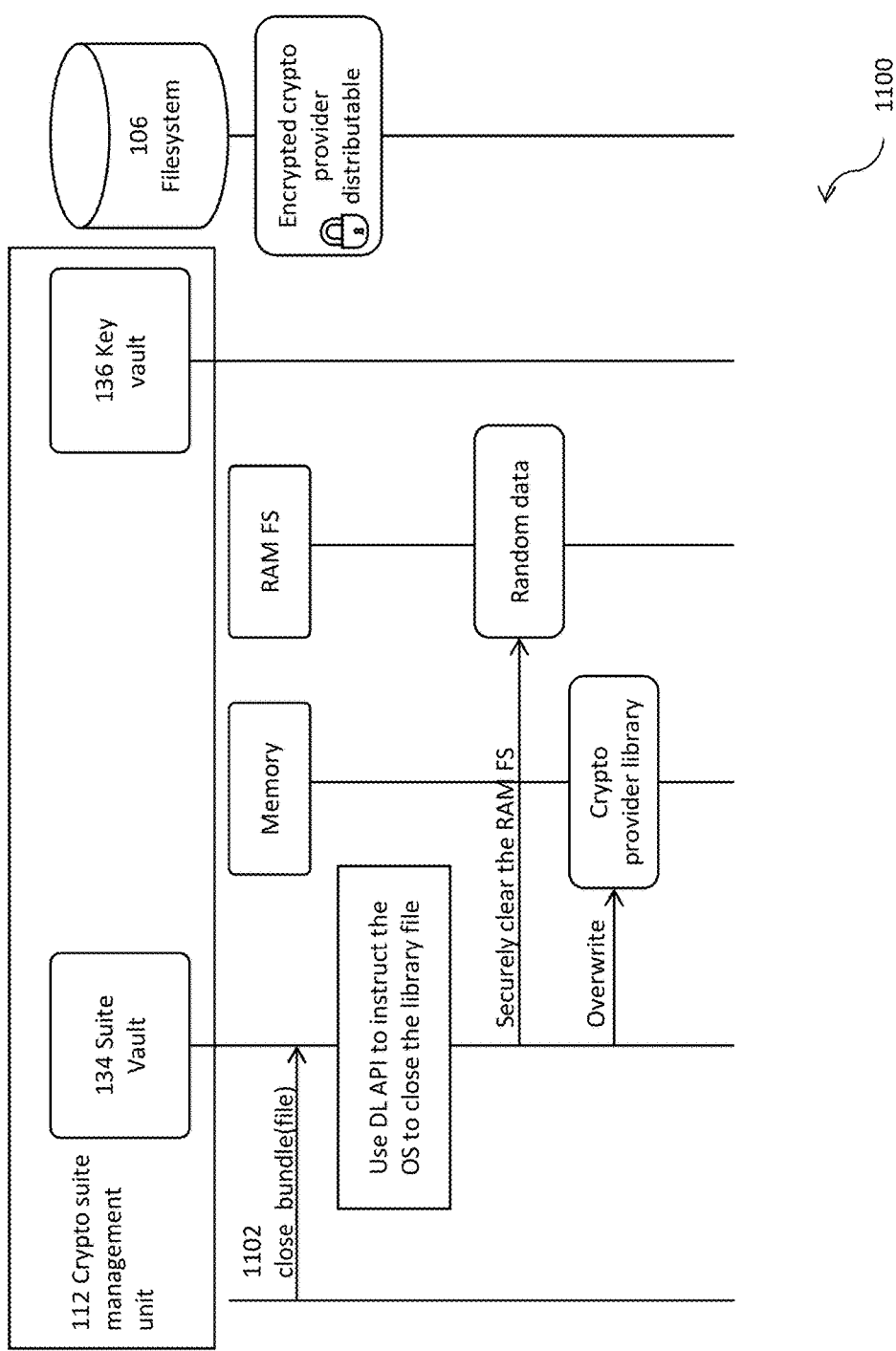
FIG. 11 illustrates a method for unloading a cryptographic provider implementation.

In one embodiment illustrated in FIG. 10, the Suite Vault 134 provides a method 1000 that allows other components of the cryptographic suite management unit 112 to trigger operations to store cryptographic provider bundles securely, and at a later time to dynamically load the cryptographic provider implementation such that the algorithms it implements are available to the application. When storing the cryptographic provider implementation, the file is encrypted, at block 1002, using cryptographic capabilities of the cryptographic suite management unit, encryption keys are saved securely in the Key Vault, and the encrypted cryptographic provider bundle is stored on persistent storage at element 1005. When an application needs to invoke functions of this cryptographic provider bundle, it is dynamically loaded by means of a load_bundle call to the Suite Vault, illustrated as element 1004. In response to this call the Suite Vault obtains the key needed to decrypt the cryptographic provider bundle from the Key Vault, illustrated as element 1006; loads the encrypted cryptographic provider bundle file from persistent storage at element 1008; decrypts the cryptographic provider bundle file at block 1008; securely erases the keys used during the decryption process from system memory; writes the decrypted cryptographic provider bundle library file to a virtual disk in volatile memory at element 1010; uses the abstraction layer to call the underlying operating system dynamic linking capabilities to load the cryptographic provider bundle from the virtual disk, thereby making the functions available to the application. The unencrypted cryptographic provider bundle file is preferably wiped and removed from the virtual disk as soon as possible. When the application no longer requires access to the functions of the specific cryptographic provider bundle implementation, the cryptographic suite management unit notifies the Suite Vault by means of a close_bundle call illustrated in FIG. 11 as element 1102 according to a method 1100. In response to this call, the Suite Vault securely clears the memory where the cryptographic provider implementation was loaded, uses the abstraction layer to call the underlying OS dynamic linking capabilities to unlink the module.

Once a cryptographic provider has been dynamically linked to the cryptographic suite management unit, the program instructions and associated data are resident in system memory where they are subject to modification by programs that have sufficient access to such system resources. Malicious software that may be running on the same platform as the cryptographic provider may be able to modify program instructions or data thereby rendering the cryptographic algorithms vulnerable and expose the data they are used to protect. The cryptographic suite management unit ensures the integrity of cryptographic provider implementations that have been dynamically loaded by implementing integrity checks on the loaded modules. When the integrity checks detect tampering of the cryptographic provider program instructions or data, information is recorded using the Logs module 130 of the cryptographic suite management unit, applications and users are alerted via the alerts module 128 and further cryptographic operations may be suspended to prevent exposure of sensitive information. The cryptographic suite management unit 112 may employ a number of integrity checking techniques including but not limited to the use of checksum functions to verify that program instructions are untampered, the use of test vectors within the cryptographic suite provider that can verify code integrity in association with meta-data that was included with the crypto-provider bundle when it was imported into the cryptographic suite management unit; the use of a challenge-response protocol between the cryptographic suite management unit and the cryptographic provider implementation.

When a cryptographic provider bundle is exchanged between two instances of the cryptographic suite management unit, the originating unit may define the policies that govern the terms of use of the cryptographic suite provider. The receiving cryptographic suite management unit enforces these policies to ensure that usage of the cryptographic suite provider by the receiving application conforms to the terms of use dictated by the originating unit. Policy rules may include but are not limited to the operating system the receiving unit is running on; the usage of a hardware suite vault or a software suite vault by the receiving unit; the cryptographic algorithms used by the receiving unit to protect the cryptographic provider; the key sizes used by the receiving unit to protect the cryptographic provider; the integrity checks performed by the receiving unit.

In aspects, the cryptographic suite management unit may enable cryptographic providers to package and distribute cryptographic plugins for distribution to multiple different platforms. Since a single binary for a cryptographic plugin may not be compatible with all platforms intended to be supported by the plugin, a packager may be invoked to package multiple binaries into a bundle of binaries configured to support multiple platforms. The bundle of binaries may be referred to herein as a "cryptographic provider bundle" 1202. The cryptographic suite management unit may be configured to import the binary at runtime for the platform of a target end user's device.

Figure 12:
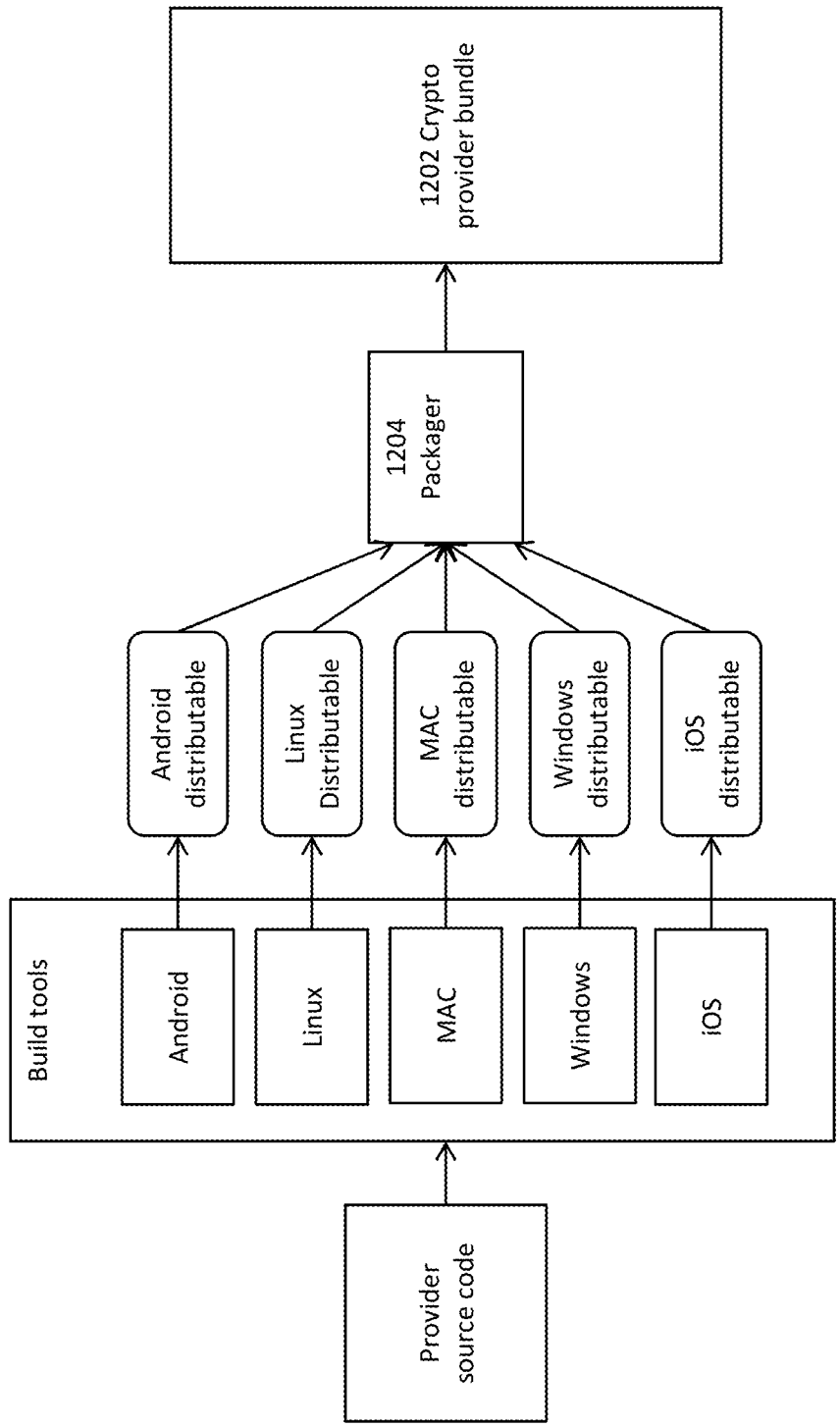
FIG. 12 illustrates a method for creating cryptographic provider bundles.

The packager 1204 bundles the distributables built for a specific cryptographic provider implementation into a single file as illustrated in FIG. 12.

Figure 13:
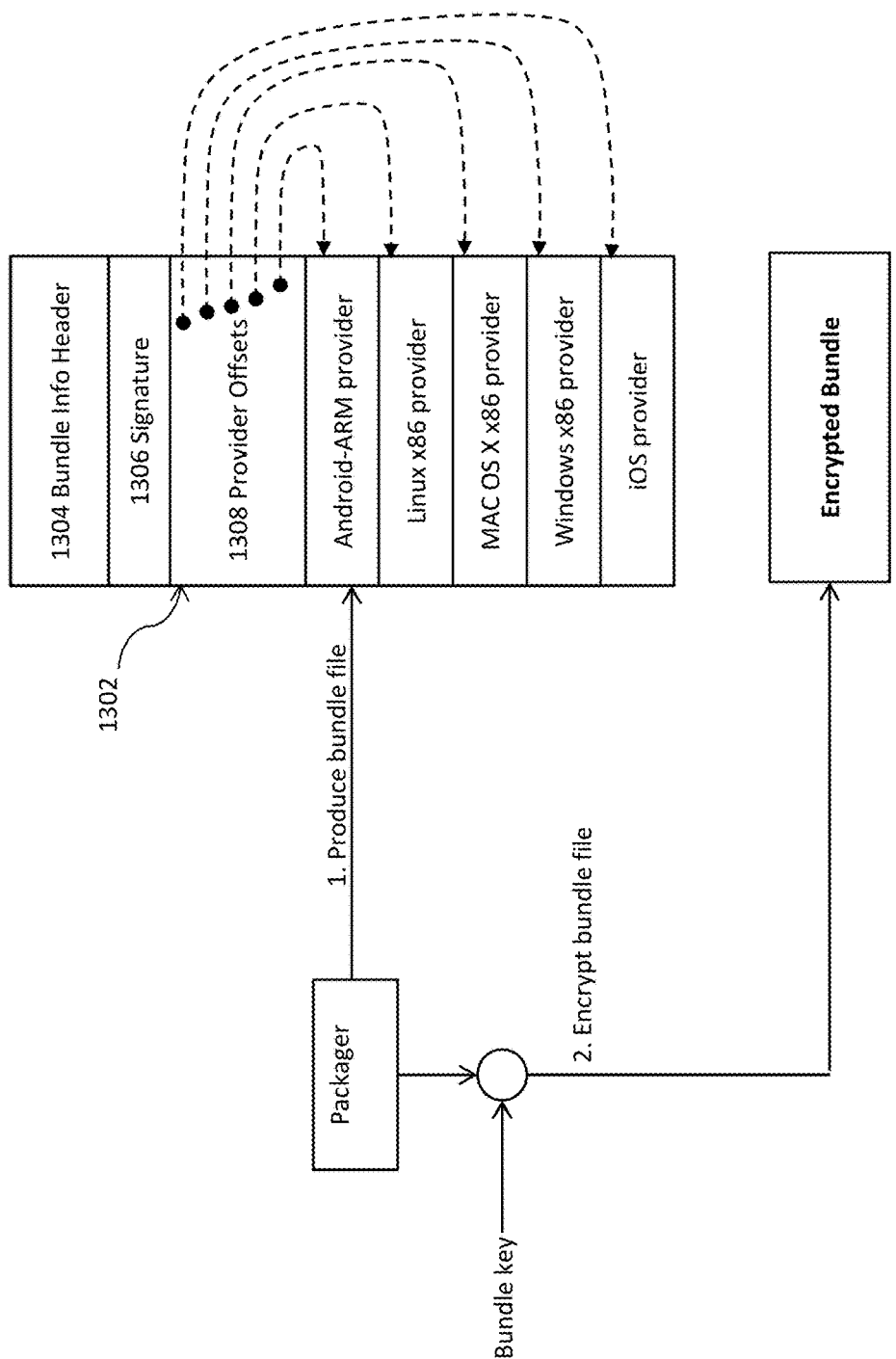
FIG. 13 illustrates a bundling and encryption configuration.

As shown in FIG. 13, the cryptographic provider bundle 1302 may comprise: a generic header 1304 containing information about the bundle, including its version and the target cryptographic suite management unit version to ensure compatibility between the cryptographic suite management unit importing the bundle and the provider implementation; security features, such as, for example, a signature 1306, to allow importing applications to ensure that (a) none of the distributables have been altered, (b) the package was produced by a trusted Packager application and (c) licensing and rights management logic can be applied to the imported cryptographic provider; and (3) a set of provider offsets 1308 defining the size and location of each individual distributable contained within the bundle file.

Figure 14:
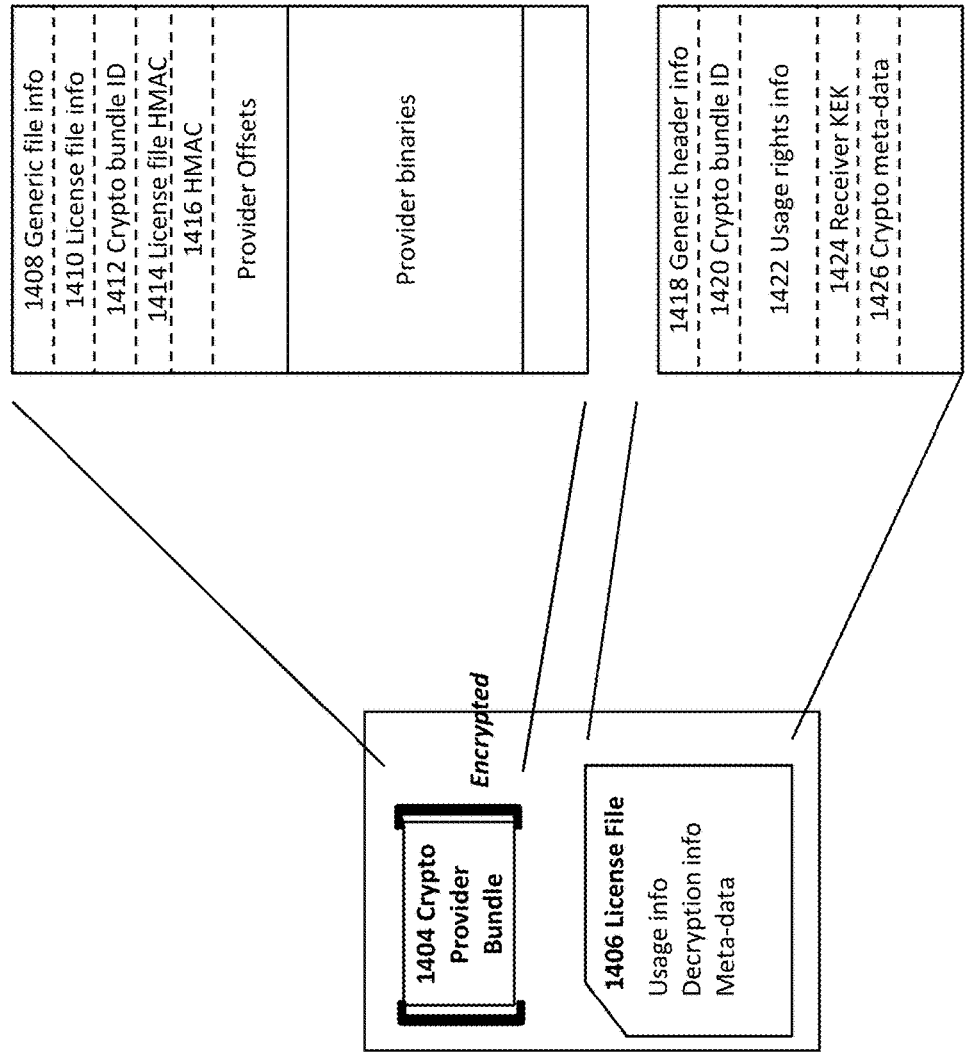
FIG. 14 illustrates another bundling configuration.

FIG. 14 more specifically illustrates the principal file header fields which the license file 1406 and the cryptographic provider bundle 1404 may comprise. The cryptographic provider bundle 1404 may comprise the following headers (which could be assigned different names as desired):

"Generic file info" 1408, which contains general cryptographic suite information such as the functions provided by the bundle, supported security level, and platform information;

"License file info" 1410, which indicates that the bundle has an application-specific license attached to it, i.e., that it is not intended for general use by any unspecified application. The field uniquely identifies the license file associated with the bundle. If left blank, the cryptographic provider suite may be considered to be open, i.e. importable by any application enabled by the cryptographic suite management unit.

"Crypto bundle ID" 1412, which is a unique bundle identifier that can be used to associate a license file with a specific bundle "License file HMAC" 1414, which stores the keyed-hash message authentication code (HMAC) of the associated license file; and "HMAC" 1416, which is the HMAC of the bundle, including all header fields, to prevent tampering.

The accompanying license file 1406 may comprise the following headers:

"Generic header info" 1418, which contains information about the license file, such as, for example, file version;

"Crypto bundle ID" 1420, which is an identifier that identifies the specific cryptographic bundle with which the license file is associated;

"Usage rights info" 1422, which contains information about the usage rights of the associated cryptographic bundle, such as, for example, start and end date, or elapsed time limitations;

"Receiver KEK" 1424, which identifies a public key provided by the recipient of the bundle that can be used to obtain the necessary decryption keys; and Cryptographic meta-data 1426 that contains information needed by the cryptographic suite management unit operation.

The packager may be further configured to produce an encrypted bundle file. Each encrypted bundle file may be encrypted such that it can only be decrypted by the intended recipient, as described herein in greater detail.

Figure 15:
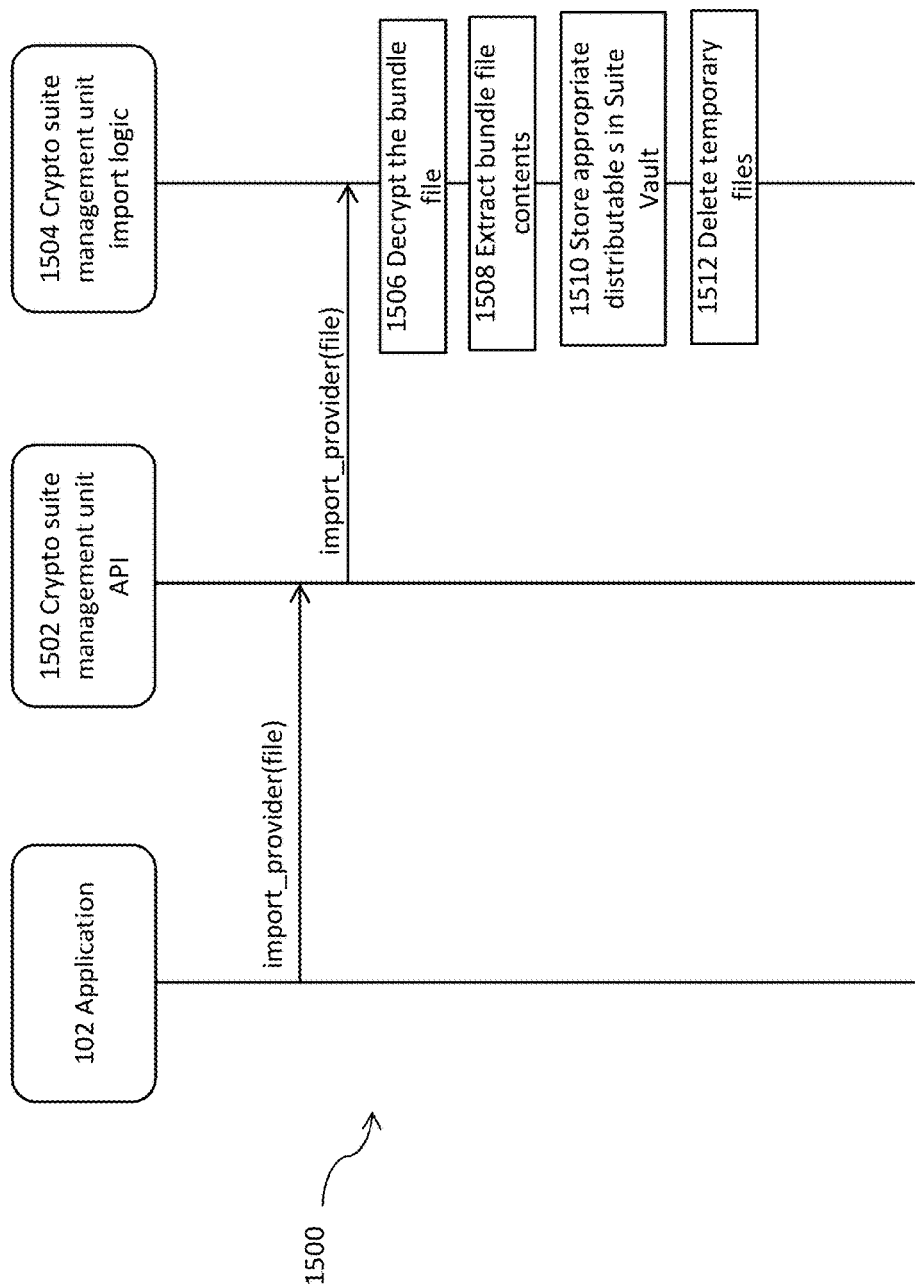
FIG. 15 illustrates a method for importing bundles.

As previously described, and as illustrated in FIG. 15 as method 1500, an application 102 may trigger the importation of a new cryptographic provider bundle either automatically or as a result of user action through the application user interface 1502. The application 102 then calls the cryptographic suite management unit 1504 to process the bundle. The file is decrypted, at block 1506, using the appropriate keys (discussed in a different scenario) and the contained provider distributables are extracted at block 1508. At block 1510, the appropriate distributables are stored securely in the Suite Vault from which they can later be dynamically loaded and executed, and the received file and any temporary files are removed at block 1512. Upon importing a cryptographic provider bundle and extracting the cryptographic provider implementation for the platform on which a cryptographic suite management unit is hosted, the cryptographic suite management unit may discard the elements of the bundle inapplicable to the host platform in order to free space. For example, during importation of a cryptographic provider bundle, the cryptographic suite management unit may store the bundle to storage, extract the relevant distributable and store it in the Suite Vault, and discard the irrelevant distributables, as shown in FIG. 15.

Alternatively, the distributables for all platforms may be saved in the Suite Vault if appropriate. For example, if the receiving application may need to export the cryptographic provider bundle for yet another application, and the policy associated with the imported cryptographic provider bundle permits it, the receiving cryptographic suite management unit may choose to store all of the distributable in the Suite Vault. In further aspects, the cryptographic suite management unit enables an actor possessing a particular cryptographic provider implementation to allow a trusted partner to use the implementation, whether with or without restrictions, such as, for example, time and/or usage and/or storage parameters. Therefore, a platform may comprise or communicate with a license manager configured to generate a license file, incorporating potential restrictions, to be provided to the trusted partner.

Figure 16:
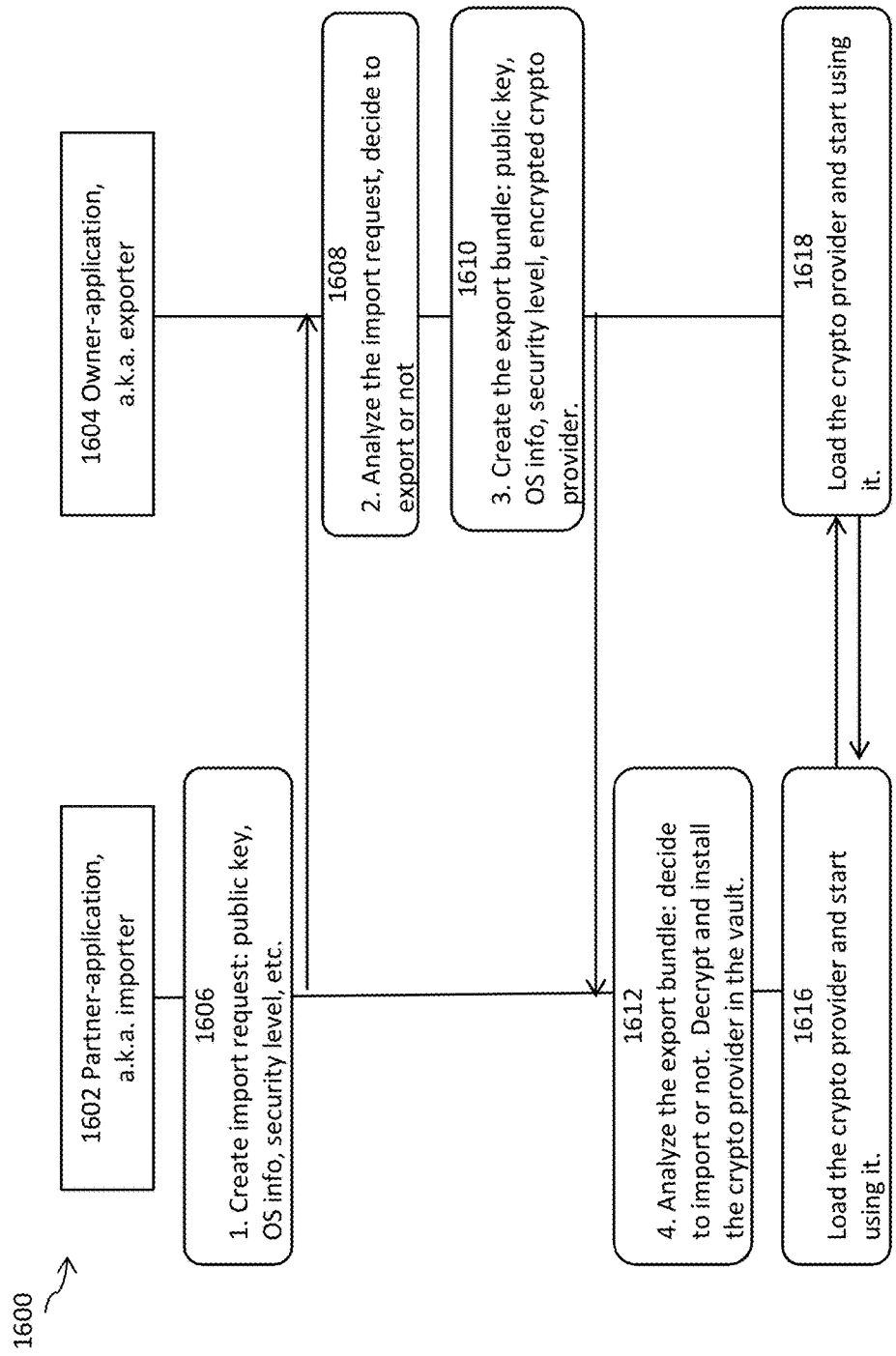
FIG. 16 illustrates a method for bundling a rights-managed cryptographic provider implementation.

The import/export operations may be structured as a protocol. Preferably, the execution of the protocol does not affect the security levels of the "owner application" 1604 and "partner application" 1602. Here, "owner application" refers to an application executing on the device as an actor possessing a given crypto-bundle, while "partner application" refers to an application corresponding to a trusted partner that is to receive the crypto-bundle, possibly under license. During this protocol, the cryptographic suite management unit makes determinations based on the values of the security level of the applications into which it is integrated, as well as the policies enforced by the applications, such as licensing. The protocol may use a public key encryption scheme, as illustrated in FIG. 16 as method 1600.

Whenever an application requests the services of a specific cryptographic provider bundle from the cryptographic suite management unit API as illustrated at block 1606, at block 1608 the cryptographic suite management unit may verify that the terms of use are still valid. If the license terms indicate that the cryptographic provider is no longer licensed for that application and/or device, the cryptographic suite management unit may automatically (i.e., without further user input) delete the requested cryptographic provider bundle from the suite vault. If, however, the license remains valid, the cryptographic suite management unit may decrypt the provider bundle and dynamically load the shared libraries as previously described, as illustrated at blocks 1616, 1618. The procedure described with reference to FIG. 16 may require that a common cryptographic provider be shared between the owner application, as illustrated at blocks 1610, 1612, the license manager and the partner application for encrypting and decrypting the file being exchanged between each. A public key encryption scheme, such as, for example, ECIES (Elliptic Curve Integrated Encryption Scheme) could be used.

It will be appreciated that the cryptographic owner may wish to control not only the terms of use but also the environment in which any exported cryptographic provider bundle will be used. Therefore, the license file accompanying the cryptographic provider bundle sent to the trusted partner may comprise one or more limitations, such as, for example, the following parameters:

- a start data and duration the bundle may be used by the trusted application;
- the total amount of data (e.g. number of bytes) that may be encrypted or decrypted using the cryptographic provider bundle
- a minimum or maximum key size that may be used with the cryptographic provider bundle (the cryptographic suite management unit in cooperation with the partner application, upon encountering this parameter, may not allow non-compliant key sizes to be used with the cryptographic provider even if the algorithms it contains support it);
- a minimum key size of the crypto-provider used by cryptographic suite management unit suite vault running in correspondence with the partner application (this can be used to prevent unsafe storage of the cryptographic provider by the partner application); and
- a flag indicating whether the partner application must have access to a hardware key vault or whether a software key vault is sufficient.

In aspects, there is provided a secure key vault to securely store encryption keys, which may be achieved as a software secure key vault, or as a hardware secure key vault.

During execution of a cryptographic function, the cryptographic suite management unit may be called to generate an asymmetric key pair and store the private key. However, the host platform for the cryptographic suite management unit may not comprise inherently secure storage facilities. Unless the host platform comprises a dedicated secure module for execution of cryptographic provider implementations, the algorithms contained within the cryptographic provider bundle may be loaded into the host platform's system memory to perform cryptographic operations. If the system memory is compromised, malicious elements may access the algorithms. Further, elements of the cryptographic provider implementation stored in persistent storage may also be exposed by any inherent insecurity of the host platform.

Figure 17:
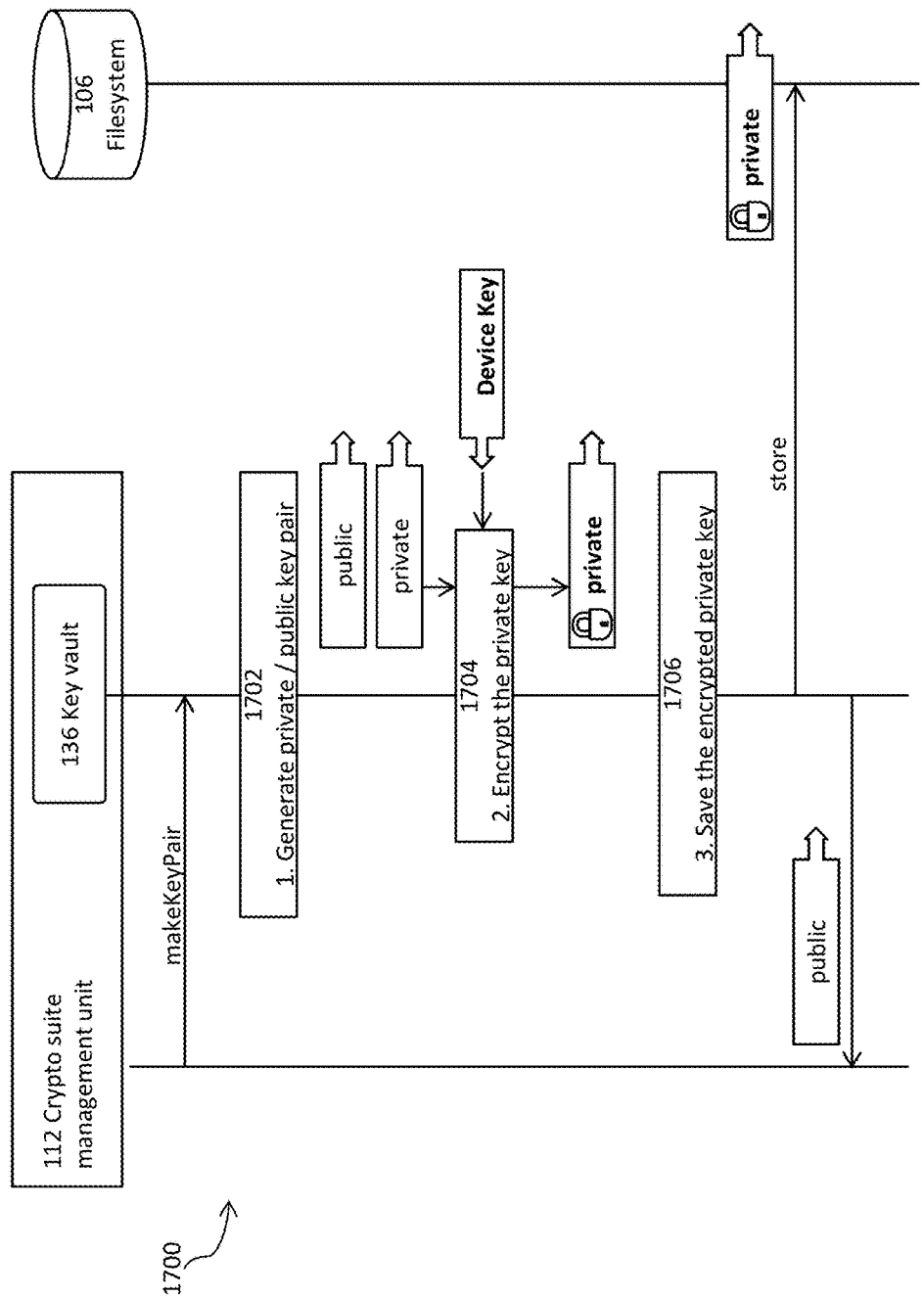
FIG. 17 illustrates a method for secure key storage.

Referring now to FIG. 17, a method 1700 for providing a software secure key vault in the cryptographic suite management unit 112 is illustrated. The Key Vault 136 stores keys on persistent storage such as a filesystem 106 on the target device in encrypted form such that they cannot be decrypted by unauthorized users or applications. In embodiments, the Key Vault on each device will generate and use a unique device key for encrypting and decrypting keys in the Key Vault, as shown at blocks 1702, 1704, 1706. Exposure of the device key to any unauthorized user or application would also expose all the keys stored in the Key Vault and therefore mechanisms must be implemented to protect the secrecy of the device key.

Figure 18:
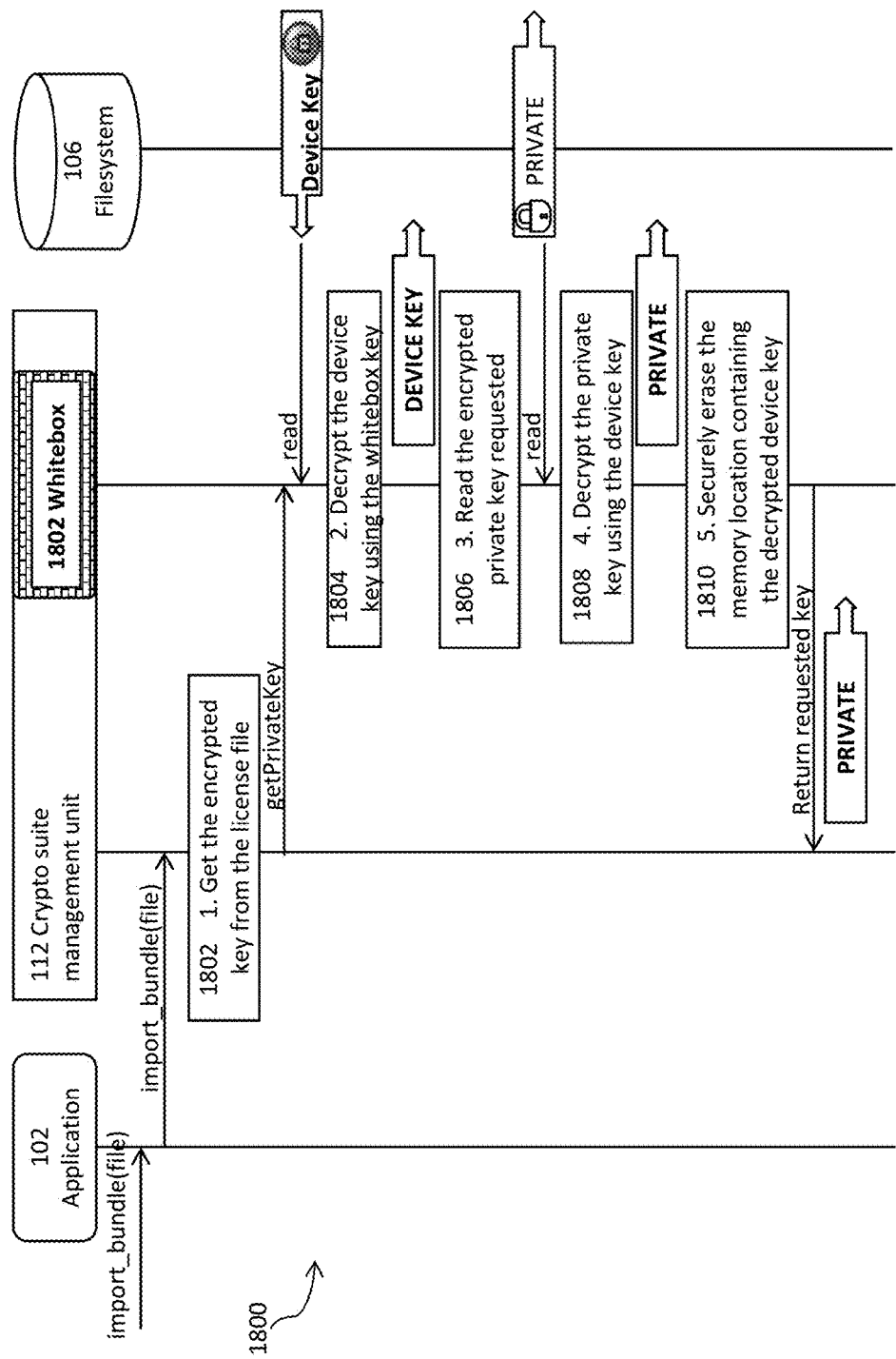
FIG. 18 illustrates another method for secure key storage.

Referring now to FIG. 18, in embodiments, a whitebox encryption technique is shown, wherein the whitebox encryption keys and algorithms are obfuscated during application build time. Once the application has been developed, suitable build tools may be invoked to convert the source code into binary files compatible with the target platform. In order to provide a whitebox module 1802, a key (or key pair) and the binary objects for the cryptographic suite management unit (which include the whitebox module) may be passed through whitebox tools to obfuscate the keys and whitebox module code. The resulting binaries may then be passed to a standard linker to produce the final application binary which contains within it code for the cryptographic suite management unit, including the whitebox module. It will be appreciated that any actor building applications comprising the cryptographic suite management unit along with the whitebox module would possess the cryptographic algorithms contained in the whitebox module. In order to prevent publication of such algorithms, the whitebox module may be shipped from a trusted party to application builders in obfuscated binary format, so that only the trusted party possess the cryptographic algorithms within the whitebox module. Alternatively, key generation and obfuscation may be performed as a cloud- or Internet-based service by a trusted party.

The resulting whitebox module contains an obfuscated key that may be used to decrypt a device key for the host platform. At runtime on the device of an end user, an application 102 utilising a cryptographic suite management unit 112 comprising the resulting whitebox may decrypt one of the private keys stored within the key vault by, according to a method 1800 shown in FIG. 18, making a call to the cryptographic suite management unit, as shown at block 1802 to: retrieve the device key; decrypt it without exposing it in system memory at block 1804; use the device key to decrypt the private key at blocks 1806,1808; and return the private key in decrypted form to the calling component as shown. Preferably, as soon as the whitebox module has decrypted the requested private key, it immediately and securely clears the memory containing the decrypted device key, as shown at block 1810. The requested private key may then be returned to the calling cryptographic suite management unit component.

More preferably still, the whitebox module may ensure that any buffers used to temporarily store the decrypted private key before returning it to the caller are securely wiped so that upon return to the caller the device key and the requested private key no longer reside anywhere in memory.

In further embodiments, the Key Vault may use a password based approach whereby the secrecy of the device key is ensured by encrypting the device key using a cryptographic provider that is available to the cryptographic suite management unit using a key that is derived from a password provided by the device user. An application running on the device that makes use of the cryptographic suite management unit would prompt the user for the device key password using the application user interface, and provide the password to the cryptographic suite management unit by means of an API call. Using the user supplied password, the Key Vault can load the encrypted device key from persistent storage, derive the decryption key needed to decrypt the device key, and use the device key to decrypt any of the keys securely stored by the Key Vault. As with the embodiment employing a whitebox encryption technique, this technique will also ensure that the user supplied password and the decrypted device key are not kept in unencrypted or unobfuscated format in volatile memory any longer than needed to perform the functions of the Key Vault, and that any buffers used to do so will be securely wiped. Furthermore, the Key Vault will never store the user supplied password or decrypted device key on persistent storage.

As an alternative to a software implementation of the secure key container, the cryptographic suite management unit may comprise a secure Key Vault module using a hardware-based tamper-resistant platform such as a Hardware Security Module (HSM) or secure element (SE) hosted on the hardware platform of the device hosting the cryptographic suite management unit. Since the HSM or SE may be used by other applications, the cryptographic suite management unit may store only the device key, as opposed to other private keys, needed to unlock other keys or sensitive data stored in the key vault. By using the SE, the device key is unexposed to system memory.

One vulnerability of using the hardware SE is that any private keys needed to decrypt cryptographic provider bundle files may reside in memory for the duration of an associated decryption operation. The cryptographic provider bundle may, however, be secured against offline attacks where the persistent storage that contains the encrypted provider bundle files and the private keys in the key vault by virtue of the fact that the device key needed to decrypt all the information is securely located within the secure element.

Figure 19:
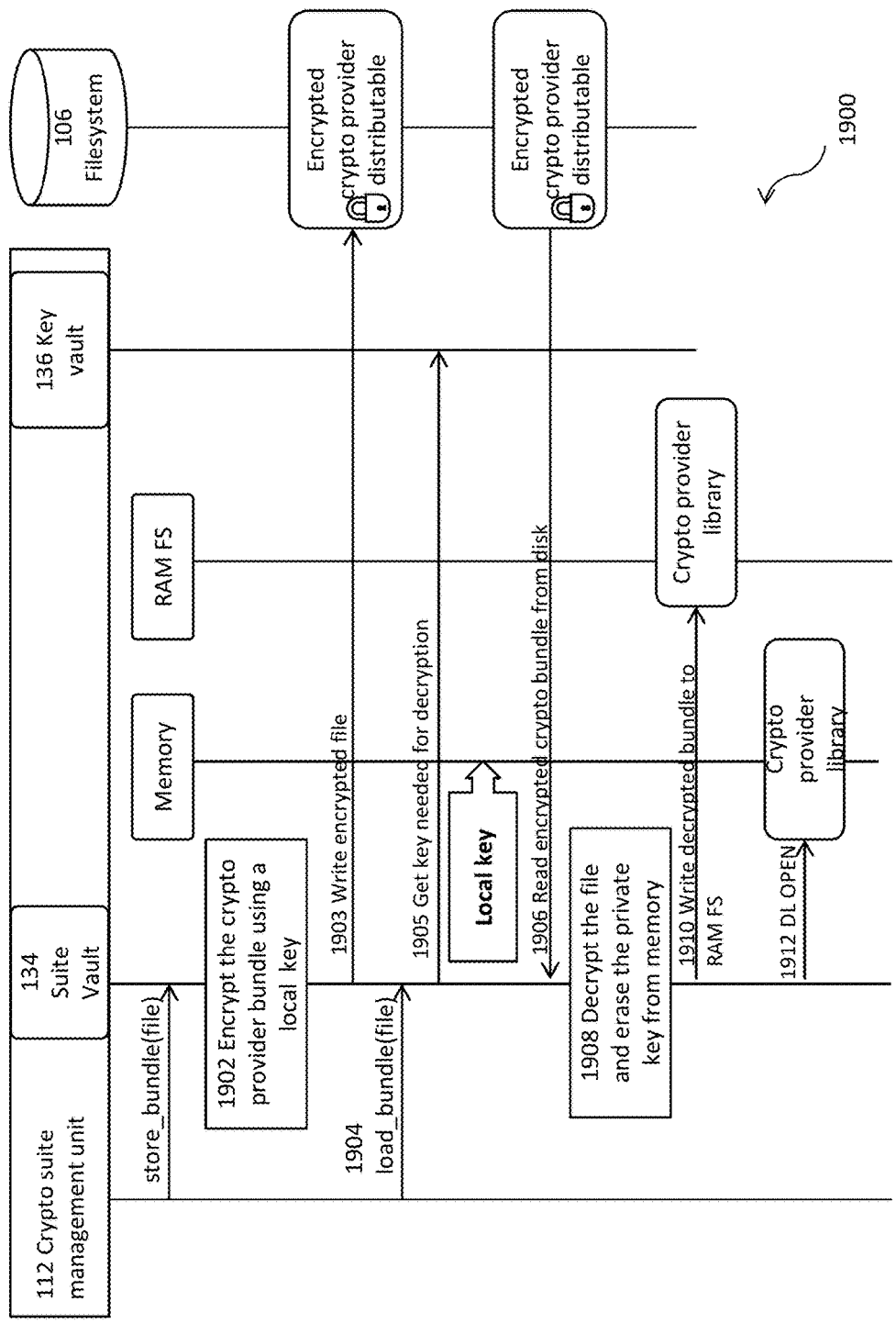
FIG. 19 illustrates a method for suite vault loading and storing.

Further to the key vault, the cryptographic suite management unit may operate in conjunction with a suite vault for implementing importing and secure storage of encrypted cryptographic provider bundles. As with the key vault, described above, the suite vault may be implemented as a hardware or software solution. Referring now to FIG. 19, an illustrative implementation of a method 1900 for accessing securely stored code from a software-implemented suite vault is illustrated. In the illustrative implementation, before the cryptographic provider bundle is stored within the persistent storage of the Suite Vault module (at element 1903), it is encrypted using a local, device-specific encryption key, as shown at block 1902. When the cryptographic suite management unit determines that it is necessary to access the cryptographic provider bundle, it makes a call to the suite vault to load the bundle, as illustrated as element 1904. Upon receiving the call, the suite vault reads the encrypted cryptographic bundle from the filesystem of the host platform as illustrated at element 1905, 1906; at block 1908 the suite vault decrypts the cryptographic provider bundle using the private key it has obtained and stores the unencrypted cryptographic provider executables in a secure area such as virtual RAM drive or trusted file system as a library to make them available to the OS for dynamic loading, as illustrated at element 1910. The suite vault then issues calls to the host operating system to load the unencrypted library to memory, as illustrated at element 1912. The unencrypted library resides in memory until the application no longer requires the library. The application preferably issues a call to the cryptographic suite management unit when it no longer requires the library so that the cryptographic suite management unit calls the suite vault to remove the unencrypted library from memory.

Figure 20:
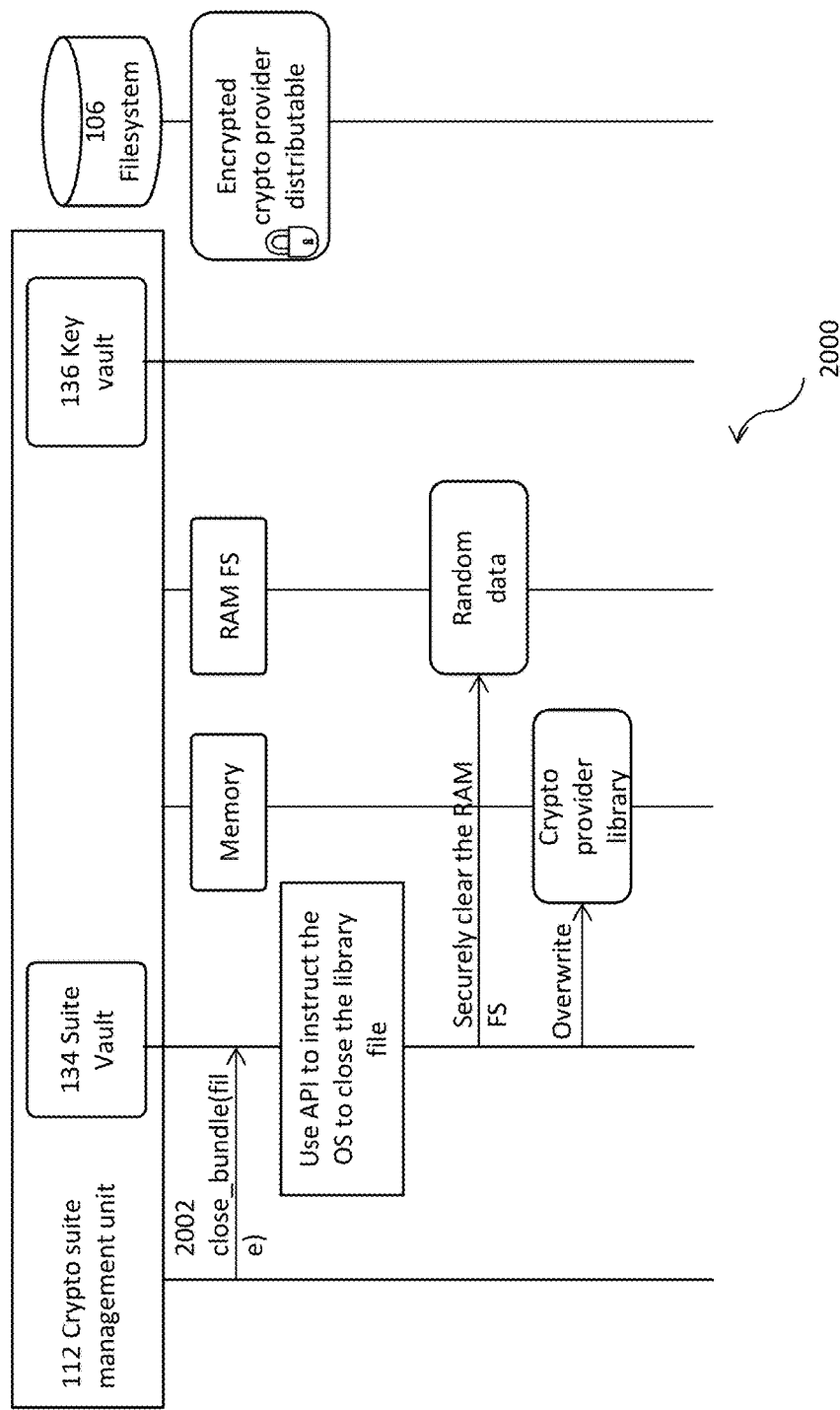
FIG. 20 illustrates a method for unloading a cryptographic provider implementation.

Referring now to FIG. 20, according to a method 2000, upon being called to remove the unencrypted library from memory, the cryptographic suite management unit calls the suite vault to securely clear the unencrypted library from memory and storage, as illustrated at element 2002. For example, if using a virtual RAM disk, the library may be overwritten using a 3-pass wipe.

Alternatively, the cryptographic suite management unit may be configured for use with a suite vault as a hardware implementation, for example, using a hardware security module (HSM), provided the host device comprises such an HSM. When using an HSM to host the cryptographic provider bundle, the functions contained within the HSM may not be modified or updated during runtime. That is, the HSM may be limited in that it may not import cryptographic provider bundles at runtime, as described with respect to software suite vault implementations.

Figure 21:
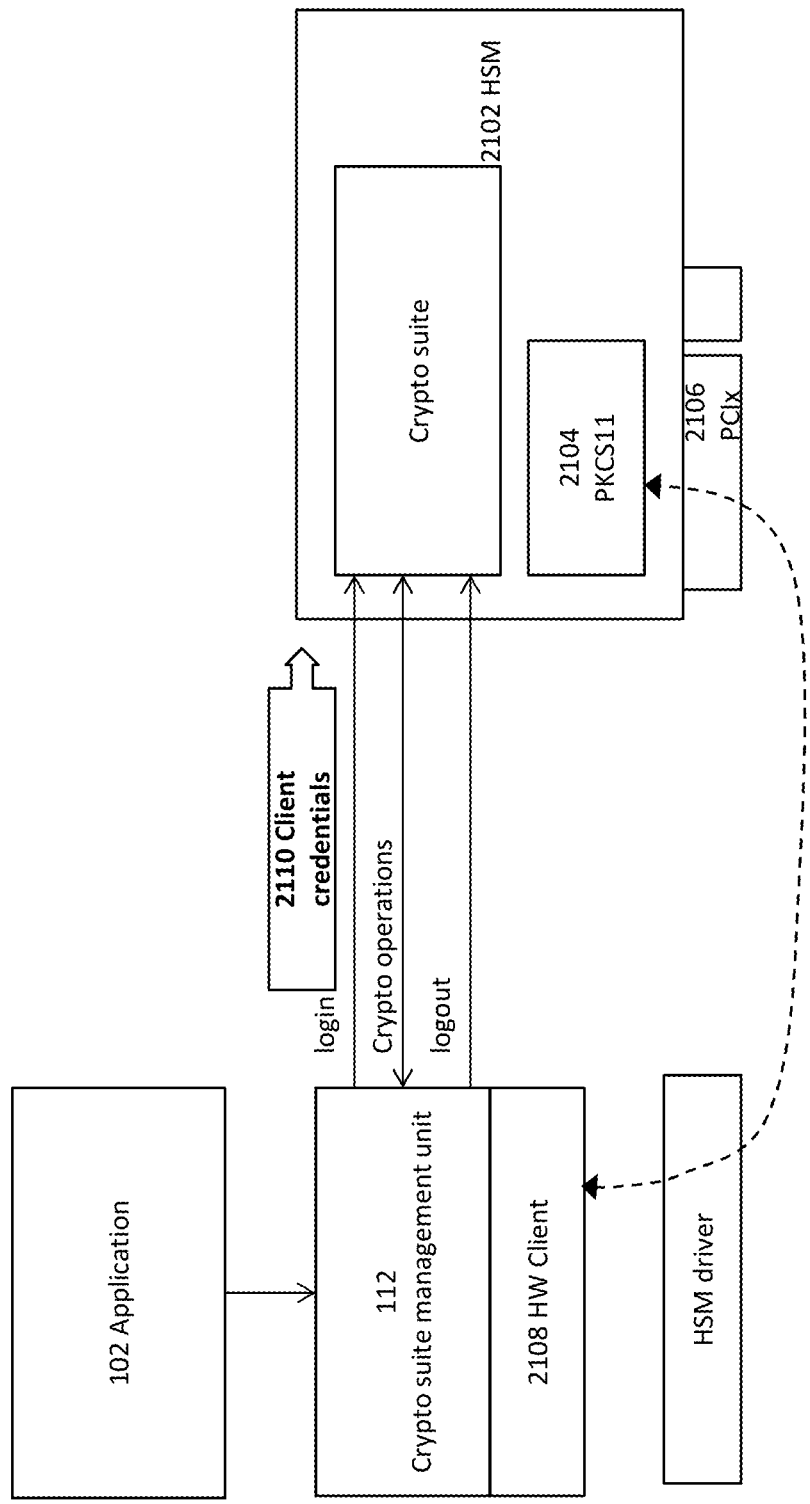
FIG. 21 illustrates a method for invoking cryptographic provider implementations in a hardware suite vault.

FIG. 21 illustrates an exemplary configuration in which the cryptographic suite management unit 112 invokes encryption operations on a platform comprising an HSM-based suite vault. The HSM 2102 may comprise an interface, such as, for example, a PCKS11 driver 2104. As shown, the HSM may be a PCIx card 2106 installed in a Linux environment. Authentication information for any application requesting any encryption operations may be stored outside of the HSM, as described below in greater detail.

Figure 22:
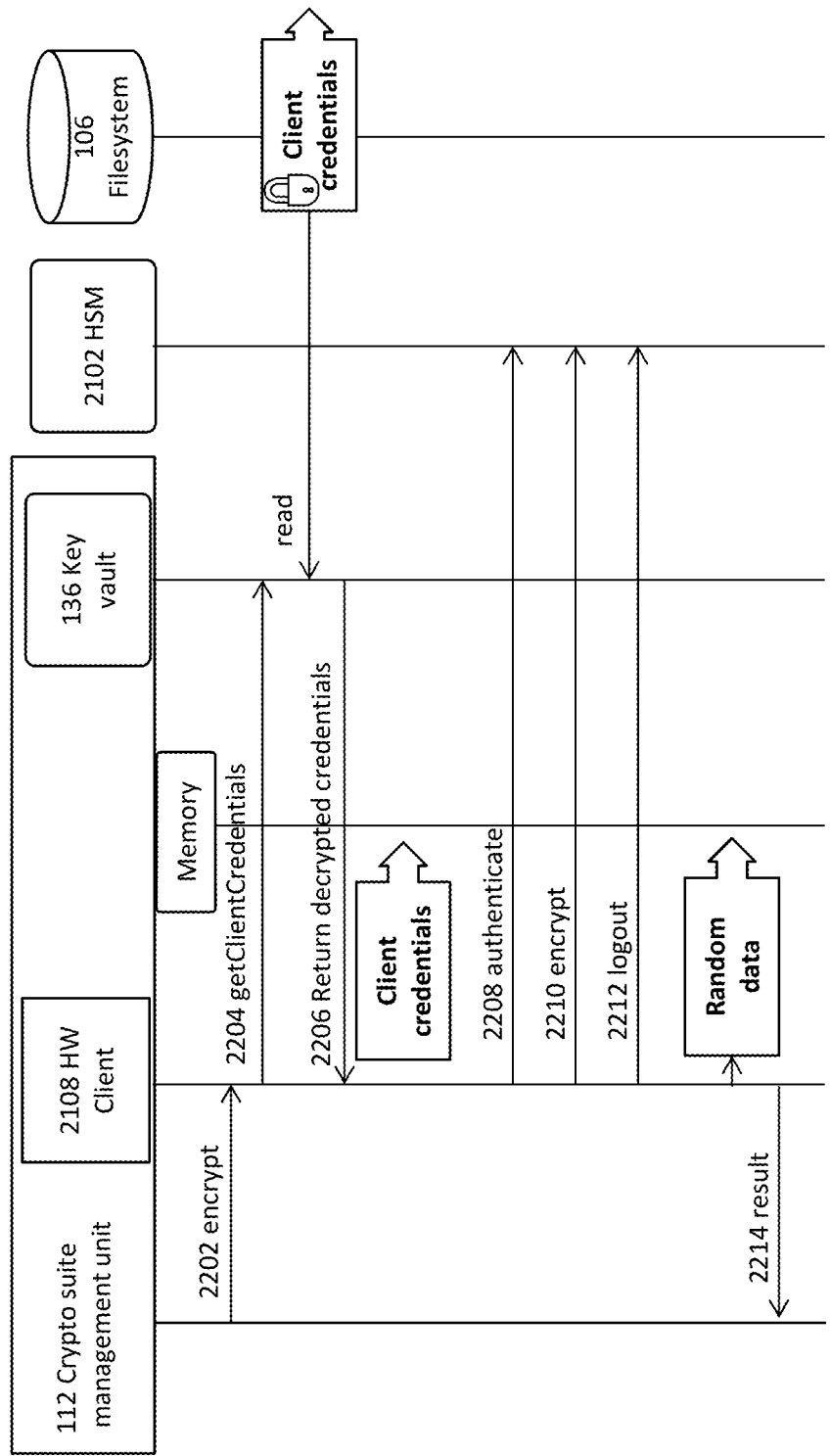
FIG. 22 illustrates a method for securely storing a cryptographic suite in a hardware suite vault.

In operation, as illustrated in FIG. 21 and in greater detail in FIG. 22, when an application 102 calls the cryptographic suite management unit 112 to invoke an encryption operation defined by a cryptographic provider bundle residing in the HSM 2102, the cryptographic suite management unit engages its HW client 2108 (illustrated at element 2202) to obtain client credentials 2110 (e.g., a client certificate) at element 2204, which are preferably obtained from the previously described key vault at element 2206. The HW client 2108, which is configured to communicate with the PKCS11 driver 2104 of the HSM 2102, provides the credentials decrypted to the HSM for authentication at element 2208. Once the HSM 2102 has authenticated the cryptographic suite management unit, the HW client calls the HSM to perform an encryption operation at element 2210 and, when this is complete, logout the HW client from the HSM at element 2212. The HW client returns the result of the encryption operation to the cryptographic suite management unit at illustrated element 2214 for provision to the calling application.

Figure 23:
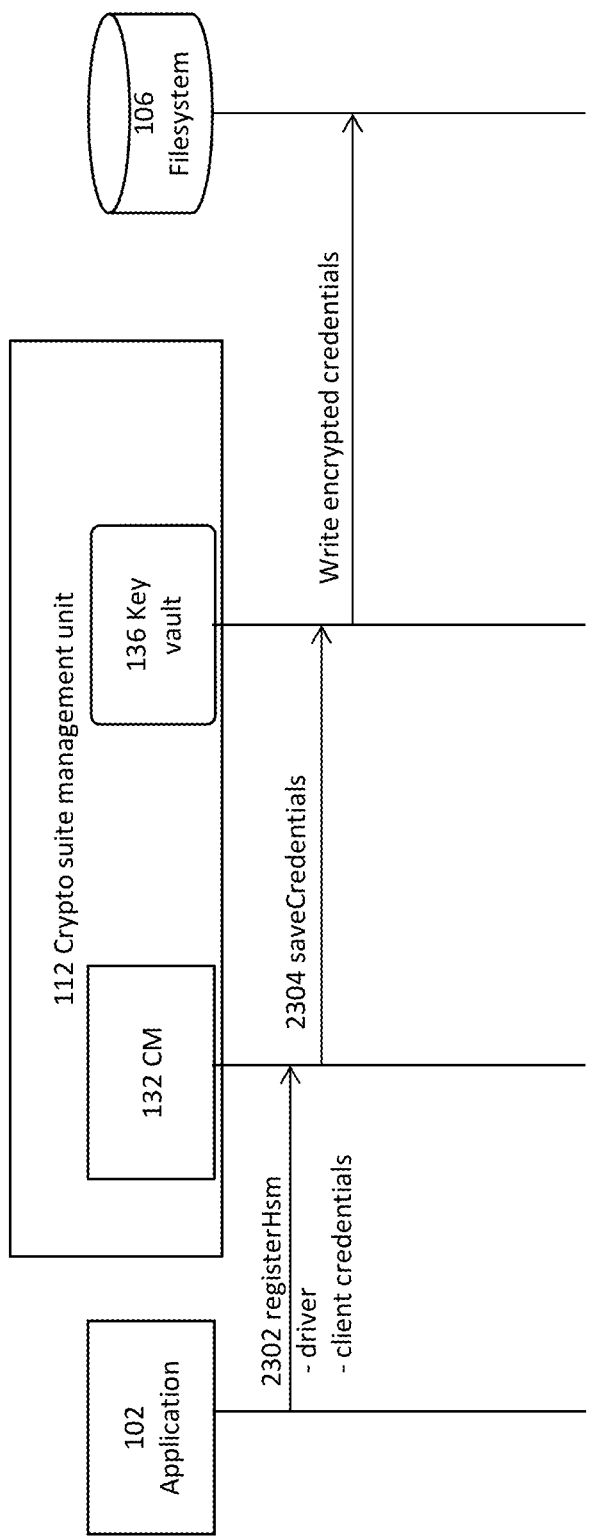
FIG. 23 illustrates a method for registering an application with a hardware secure module.

In the scenario illustrated in FIGS. 21 and 22, the cryptographic suite management unit provides client credentials to the HSM for authentication. As previously described, these are preferably obtained from the key vault 136. In order to initially place the client credentials in the key vault 136, the cryptographic suite management unit 112 obtains them from the calling application, as illustrated in FIG. 23. Once the application or end user of the application obtains the client credentials, the application supplies the CM 132 of the cryptographic suite management unit 112 with the credentials, illustrated at element 2302, as well as the path to the PKCS#11 driver. The cryptographic suite management 112 unit saves the credentials to the key vault as illustrated at element 2304, and updates the CM 132 to store the path to the PKCS#11 driver.

In aspects, as previously described, a system for cryptographic suite management may enable an application to invoke a plurality of cryptographic functions from a plurality of cryptographic provider implementations. The cryptographic suite management unit may further comprise a cryptographic abstraction API for accessing cryptographic functions of the available cryptographic suites. The cryptographic abstraction API may comprise abstracted cryptographic primitives enabling applications to instantiate diverse cryptographic provider implementations. The cryptographic abstraction API may be understood as a set of APIs, each of which represents a grouping of operations to be performed by the underlying cryptographic provider implementations. For example, the cryptographic abstraction API may comprise the following set of APIs, amongst others:

Random number API;
Hashing functions API;
Public key ciphers API; and
Symmetric key ciphers API.

Further, the cryptographic abstraction API may comprise: functions enabling a calling application to determine the range of values that are applicable for the specific cryptographic provider implementation being invoked; and error and return status codes common to diverse cryptographic provider implementations for communicating status to the calling application. For example, referring to FIG. 24, the cryptographic abstraction API may comprise a block cipher API 2402 amongst its set. The block cipher API, in turn, may comprise the following primitives to call associated functions:

init_cipher: function used to initialize the parameters of the block cipher implementation;
generate_key: function used to generate the key schedule for encryption and/or decryption;
encrypt: function used to encrypt a block of data; and
decrypt: function used to decrypt a block of data.

Continuing with the same example, the init_cipher function may require a list of arguments applicable to block cipher implementations, such as:

Key size;
Key value;
Block size; and
Cipher mode.

However, across diverse cryptographic provider implementations, some implementations may permit different value ranges for the arguments. For example, Crypto-Provider-A may only support key sizes of 128 and 256 bits while Crypto-Provide-B may support key sizes of 128, 256, 512 and 1024 bits. Therefore, the block cipher API 2402 may comprise the following primitives to return permissible value ranges to the calling application for a given cryptographic provider implementation:

get_key_sizes
get_block_size_range
get_cipher_modes

Figure 24:
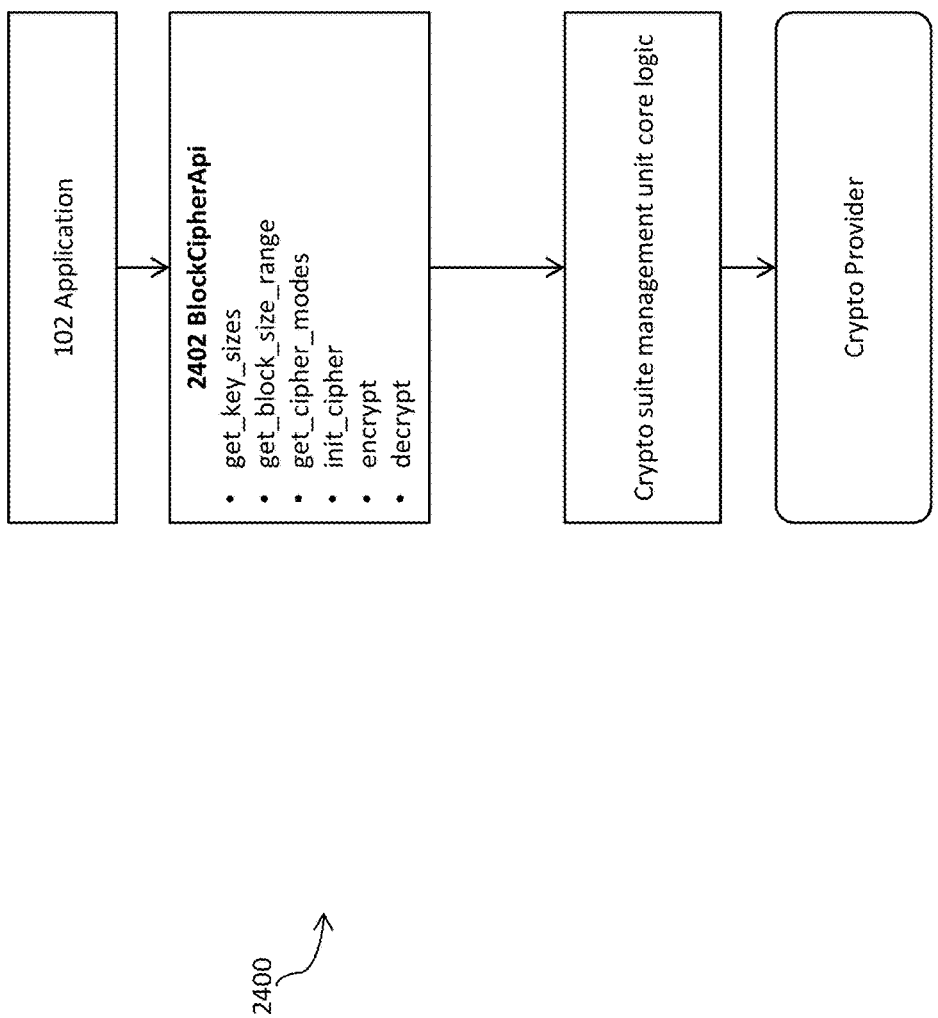
FIG. 24 illustrates a configuration for cryptographic abstraction.

As shown in FIG. 24, according to a method 2400, the calling application 102 may first initiate a call to the cryptographic suite management unit 112 to return, for example, permissible key sizes, block size ranges and cipher modes for a cryptographic provider implementation. The calling application may then use the returned parameters to validly initiate calls according to the available primitives. The following pseudo-code is illustrative of the scenario shown in FIG. 24:

```
int   keySizeArray[ ]; int    numKeyEntries;
int   minBlockSize,maxBlockSize; int    cipherModes[ ];
int   numCipherModes;
/* error checking omitted for readability */
get_key_sizes(keySizeArray, &numKeyEntries);
get_block_size_range(&minBlockSize,&maxBlockSize);
get_cipher_modes(cipherModes, numCipherModes);
/*initialize the cryptographic provider with the largest key size, smallest
block size and first available block mode
*/
init_cipher(key_sizes[numKeyEntries-1], minBlockSize, cipherModes[0],
...);
encrypt(data);
```

In further aspects, a system for cryptographic suite management may enable trans-cryption services between parties invoking different cryptographic algorithms. In certain scenarios, two parties wishing to communicate securely with each other may use different cryptographic provider implementations for encryption and decryption. In the event that each party is unwilling or unable to share the cryptographic provider implementation with the other, an intermediary gateway may proxy the data and transform the data such that it can be decrypted using the cryptographic provider implementation available at the receiving application which will be referred to as a trans-cryption service. The gateway may be, for example, a VoIP call server using a SIP message exchange sequence to establish a VoIP connection between the two parties. In the preceding example, the first party may send a SIP INVITE message comprising the SIP URI of the receiving party. Alternatively, the gateway may be an HTTP Proxy Server in which a first party connects securely to the HTTP Proxy Server, and provides the URL of the HTTP server (i.e., the second party) to which it is requesting a connection. The trans-cryption service is provided by a trans-cryption module, which is based on a cryptographic suite.

Figure 25:
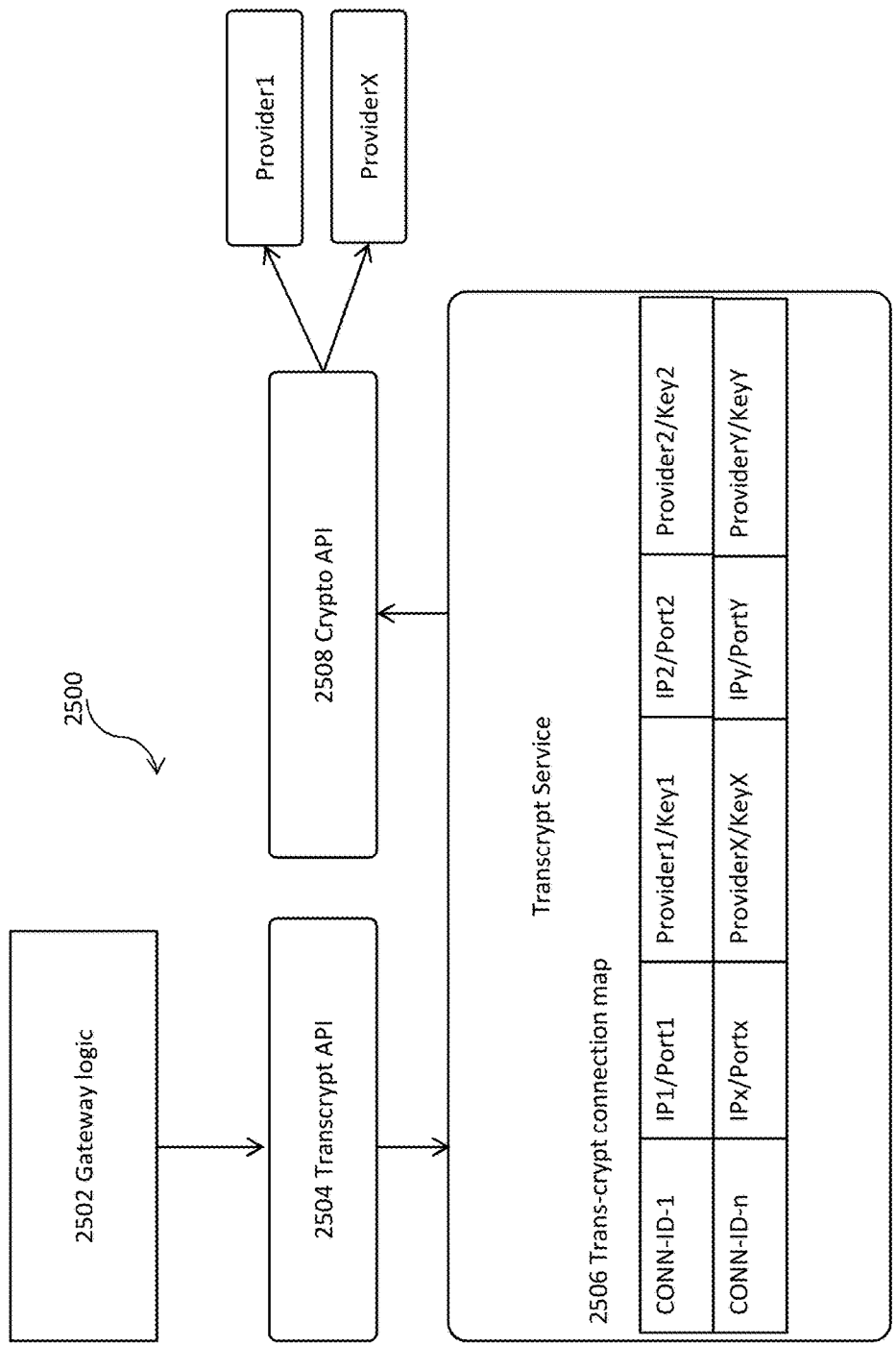
FIG. 25 illustrates a configuration for trans-cryption.

FIG. 25 illustrates a gateway configuration 2500 for providing proxy and trans-cryption services. The gateway comprises: gateway logic 2502, which is configured to make calls to a trans-crypt module via a transcript API 2504. The trans-crypt module comprises a trans-crypt connection map 2506 for mapping the communication parameters for each endpoint (i.e., party). The trans-crypt module is configured to call cryptographic provider implementations via a cryptographic API 2508, including the cryptographic provider implementations used by both the parties.

Figure 26:
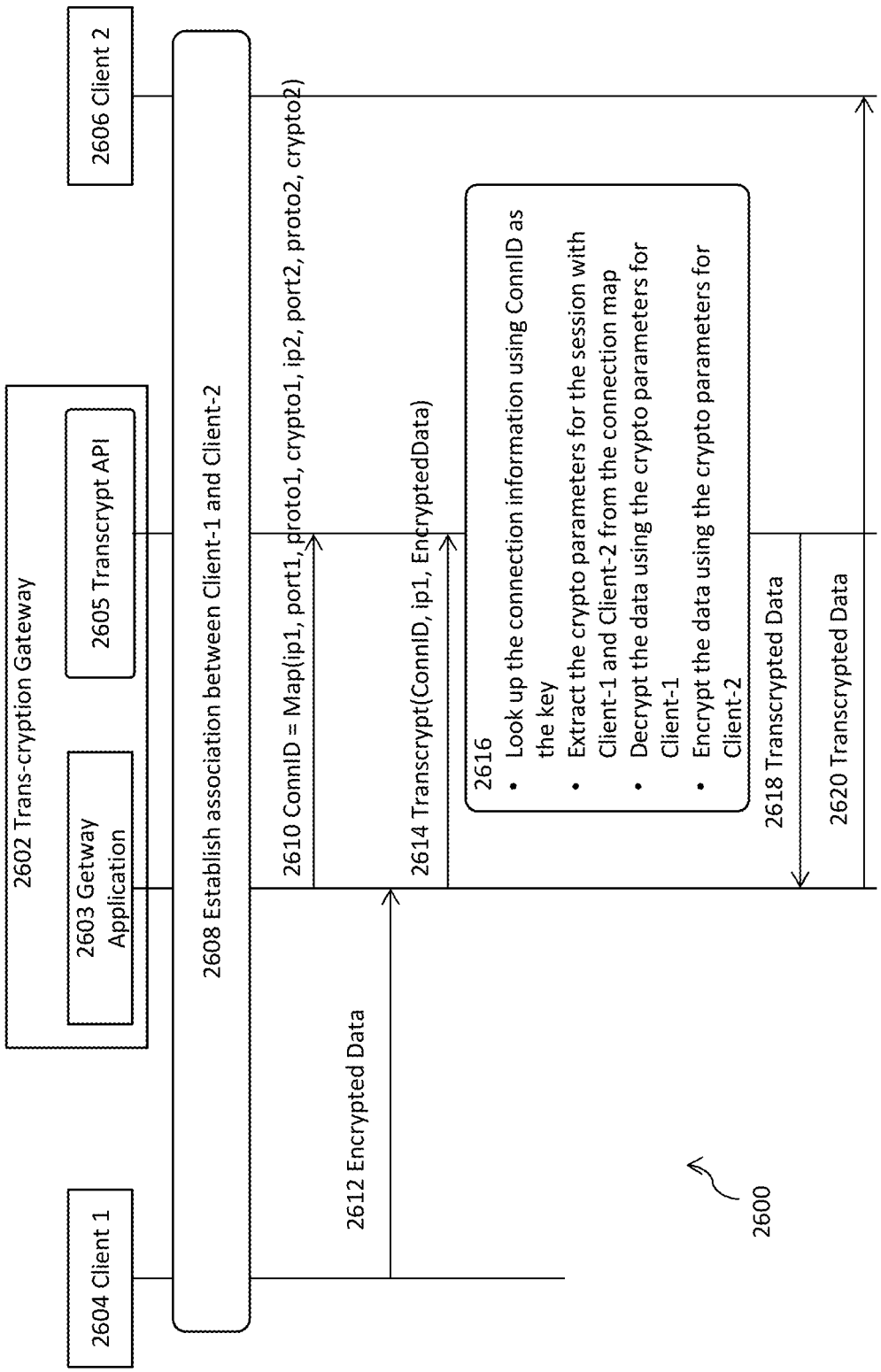
FIG. 26 illustrates a method for trans-cryption.

FIG. 26 illustrates a method 2600 for providing proxy and trans-cryption services using the gateway. The gateway 2602 establishes a connection between two endpoints. The gateway then identifies the connection between the two endpoints (i.e., parties) (2604, 2606) by associating state information for the two parties; and the gateway uses the state information to define the communication parameters associated with each endpoint, illustrated at block 2608. Communication parameters for each endpoint comprise:

The endpoint IP address and protocol (TCP or UDP);
The TCP or UDP port of the connection;
The cryptographic provider bundle used to encrypt and/or decrypt data exchanged with that endpoint; and
The session keys to encrypt and/or decrypt data exchanged with that endpoint.

Once the gateway acquires the communication parameters for each endpoint, it issues a call to the trans-crypt module via the trans-crypt API to invoke a Map method, illustrated as element 2610. The Map method stores the communication parameters in the trans-crypt connection map. Each entry in the trans-crypt connection map is assigned a unique connection ID.

When a first client transmits encrypted data to the trans-cryption gateway, as illustrated at element 2612, the gateway calls 2603 the trans-crypt module via the trans-crypt API 2605, as illustrated at element 2614, providing the following parameters:

The unique connection ID that was returned by the earlier call to the Map method;
The encrypted data received from the first client endpoint; and
A source identifier (e.g. IP address) identifying the first client endpoint.

The trans-crypt module then performs the following operations at block 2616: (i) it uses the connection ID to locate the entry associated to the connection ID in the trans-crypt connection map; (ii) it calls the cryptographic provider implementation associated with the connection ID for the first client endpoint to decrypt the data; (ii) it calls the cryptographic provider implementation associated with the connection ID for the second client endpoint to encrypt the decrypted data; and (iv) it returns the re-encrypted data to the caller as a buffer, at element 2618. The gateway then transmits the re-encrypted buffer to the second client, as illustrated at element 2620.

When data needs to be trans-crypted, the application supplies the source connection ID, destination connection ID and encrypted data to the trans-cryption service running within the secure computing environment, and receives the trans-crypted data back from the service. The cryptographic suite management does not expose the internals of the transcryption service to the application.

In aspects, the cryptographic provider bundles, policies that are associated with them, and the collection of cryptographic suite management units that are all part of a given administrative domain may be managed by a Policy Manager as illustrated in FIG. 27. In embodiments the Policy Manager 2700 may consist of an Application User Interface 2702 for interacting with application users; a Policy Management Logic 2704 component that provides the functions needed to manage the collection of cryptographic provider bundles 2706, policies 2708 and endpoints 2710 and communicates with the cryptographic suite management units 2712 within the administrative domain; a Crypto Provider DB that contains the collection of all cryptographic provider bundles available within the administrative domain, a Policy DB that contains the collection of policies that may be applied to each cryptographic provider bundle and an Endpoint DB that contains information about each cryptographic suite management unit within the administrative domain including information needed to securely communicate with the endpoint (e.g. IP address and security credentials).

In embodiments, the Policy Manager may communicate with one or more cryptographic suite management unit over a network 2714 to distribute cryptographic provider bundles; to delete cryptographic provider bundles available in a cryptographic suite management unit; to communicate policy information associated with one or more cryptographic provider bundle; to communicate configuration information for the cryptographic suite management unit; to obtain status and performance statistics from a cryptographic suite management unit; and/or to perform a management or security audit of a cryptographic suite management unit. It should be noted that the Policy Manager is an optional component of the solution. Administrative users can perform the same operations on individual cryptographic suite management unit instances through the available application user interfaces and the cryptographic suite management unit APIs. Furthermore, all of the operations involved in exporting/importing cryptographic provider bundles between cryptographic suite management unit instances and the associated functionality of defining and enforcing usage policies and corresponding security measures can be achieved without the use of the Policy Manager component as described in the corresponding sections above.

The collection of cryptographic suite management unit instances being managed as tracked in the Endpoint DB may be populated by a plurality of methods including manually provisioned by an administrative user, automatically provisioned by means of a discovery protocol whereby the Policy Management Logic component scans the network to discover instances of cryptographic suite management units, or by means of a registration protocol whereby cryptographic suite management unit instances register with a particular Policy Manager. The Policy Management Logic provides the functionality needed to add new entries to the Endpoint DB, updated existing ones or delete entries from the Endpoint DB either in response to user action or as initiated by an automated process.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

What is claimed is:

1. A method for cryptographic suite management for determining a cryptographic implementation between at least a first correspondent and a second correspondent, each of the correspondents comprising one or more processors configured to execute the cryptographic implementation, comprising:
   a. configuring, using one or more processors of the first correspondent, the first correspondent linked to a first cryptographic suite management unit to transmit an import request to the second correspondent linked to a second cryptographic suite management unit, the request comprising the identification of a cryptographic implementation and security requirements for the cryptographic implementation for exportation by the second correspondent;

b. configuring, using one or more processors of the second correspondent, a second cryptographic suite management unit to provide the cryptographic implementation configured using the security requirements;

c. configuring, using one or more processors of the second correspondent, the second correspondent to export the configured cryptographic implementation to the first correspondent; and d. configuring, using one or more processors of the first correspondent, the first cryptographic suite management unit to securely import the configured cryptographic implementation for use by the first correspondent.

2. The method of claim 1, further comprising configuring a third correspondent, using one or more processors of the third correspondent, to interact with the second correspondent in identical manner as the interaction between the first correspondent and the second correspondent, wherein the second correspondent is a trusted third party intermediary facilitating secure communication between the first correspondent and the third correspondent.

3. The method of claim 1, wherein each cryptographic suite management unit is configured to store a plurality of cryptographic implementations in a secured suite vault for use and export to other correspondents.

4. The method of claim 3, wherein each cryptographic suite management unit is configured to dynamically load each of the plurality of cryptographic implementations from its suite vault for use in a secure communication.

5. The method of claim 3, wherein the suite vault encrypts each cryptographic implementation during storage and stores a copy of the keys used for the encryption.

6. The method of claim 5, wherein upon a request to obtain the cryptographic implementation, the suite vault obtains the encrypted cryptographic implementation and the keys, decrypts the cryptographic implementation using the keys, securely erases the keys, writes the cryptographic implementation to a virtual disk in volatile memory, makes the cryptographic implementation available to a requesting application, and removes the cryptographic implementation from the virtual disk.

7. The method of claim 1, wherein the request and exportation is structured as a protocol that securely negotiates cryptographic and security requirements of importers and exporters.

8. The method of claim 7, wherein the protocol uses a public key encryption scheme and comprises:

a. the first correspondent sends an import request, including its public key, the security level of its application, and the security level and platform expected for the cryptographic provider, to the second correspondent;

b. the second correspondent analyzes the request, taking into account its application security level and its cryptographic suite management policy, searches for a match through its cryptographic providers, and decides to export or not;

c. upon the second correspondent deciding to export, the second correspondent creates an export bundle including:
  i. its public key;
  ii. its application security level;
  iii. information about the cryptographic implementation use and implementation;
  iv. the cryptographic implementation, encrypted with first correspondent's public key and, if necessary, second correspondent's private key;

d. the bundle is exported to the first correspondent;

e. the first correspondent receives the bundle, extracts the information and decides to accept it or not, based on the information and its management policy;

f. the first correspondent decrypts the cryptographic implementation with the first correspondent's private key and, if necessary, second correspondent's public key.

9. The method of claim 8, wherein the public key encryption scheme is ECIES (Elliptic Curve Integrated Encryption Scheme).

10. The method of claim 9, including a registration phase, when the first and second correspondents are endpoints, each endpoint exporting its cryptographic implementation to the cryptographic suite management unit which is an intermediary in the communication channel between the two endpoints, followed by the execution of a key agreement protocol to generate symmetric keys for each of the two pairs comprising the cryptographic suite management unit and each of the endpoints.

11. The method of claim 10, including a service of translation of ciphertexts produced by one first endpoint into ciphertexts of the other second endpoint.

12. The method of claim 11, the translation service including:

a. the first endpoint encrypting a plaintext with its symmetric encryption scheme and the key established between the first endpoint and the cryptographic suite management unit during the registration;

b. transmitting the resulting ciphertext to the cryptographic suite management unit;

c. the cryptographic suite management unit decrypting the resulting ciphertext with the first endpoint's encryption/decryption scheme and the key established during its registration, encrypting the resulting plaintext with the second endpoint's encryption scheme and the key established between the second endpoint and the cryptographic suite management unit during the registration, and sending the resulting ciphertext to the second endpoint;

d. the second endpoint decrypting the received ciphertext with its decryption scheme and the key established between the second endpoint and the cryptographic suite management unit during the registration.

13. The method of claim 1, wherein the cryptographic suite management unit provides dynamic linking of cryptographic implementations for applications executing on the correspondents.

14. The method of claim 1, wherein the cryptographic suite management unit ensures the integrity of the cryptographic implementations being made available to requesting applications.

15. The method of claim 1, wherein the second cryptographic suite management unit is configured to define policies that govern terms of use of the cryptographic implementation.

16. The method of claim 15, wherein the policies comprise license terms defining the applications and devices that are permitted to use the cryptographic implementation.

17. The method of claim 15, wherein the policies comprise license terms defining the timeframe during which the cryptographic implementation is permitted to be used.

18. The method of claim 15, wherein upon an application or device attempting to use a cryptographic implementation in an unpermitted manner, the cryptographic suite management unit deletes the cryptographic implementation from the suite vault.

19. The method of claim 1, wherein the first correspondent provides its public key in the request.

* * * * *